US008780452B2

(12) United States Patent
Matsui

(10) Patent No.: US 8,780,452 B2
(45) Date of Patent: Jul. 15, 2014

(54) ZOOM LENS AND IMAGING APPARATUS

(71) Applicant: Sony Corporation, Tokyo (JP)

(72) Inventor: Takumi Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/661,938

(22) Filed: Oct. 26, 2012

(65) Prior Publication Data

US 2013/0155312 A1    Jun. 20, 2013

(30) Foreign Application Priority Data

Dec. 14, 2011  (JP) .................................. 2011-272948

(51) Int. Cl.
G02B 15/14 (2006.01)
H04N 5/225 (2006.01)

(52) U.S. Cl.
USPC ............................ 359/687; 359/686; 348/340

(58) Field of Classification Search
CPC ................................ G02B 15/14; G02B 15/20
USPC ................ 348/240.3, 340; 359/683, 686, 687
See application file for complete search history.

(56) References Cited

U.S. PATENT DOCUMENTS 7,061,686 B2 *  6/2006  Ohtake .......................... 359/687

FOREIGN PATENT DOCUMENTS

JP    2009-186983 A    8/2009

* cited by examiner

Primary Examiner — David N Spector
(74) Attorney, Agent, or Firm — Rader, Fishman & Grauer PLLC

(57) ABSTRACT

Disclosed herein is a zoom lens, including: a first lens group having a positive refracting power; a second lens group having a negative refracting power; a third lens group having a positive refracting power; and a fourth lens group having a positive refracting power; the first, second, third and fourth lens groups being disposed in order from the object side; the lens groups moving upon zooming from a wide angle end to a telephoto end of the zoom lens such that the distance between the first lens group and the second lens group increases while the distance between the second lens group and the third lens group decreases.

19 Claims, 13 Drawing Sheets

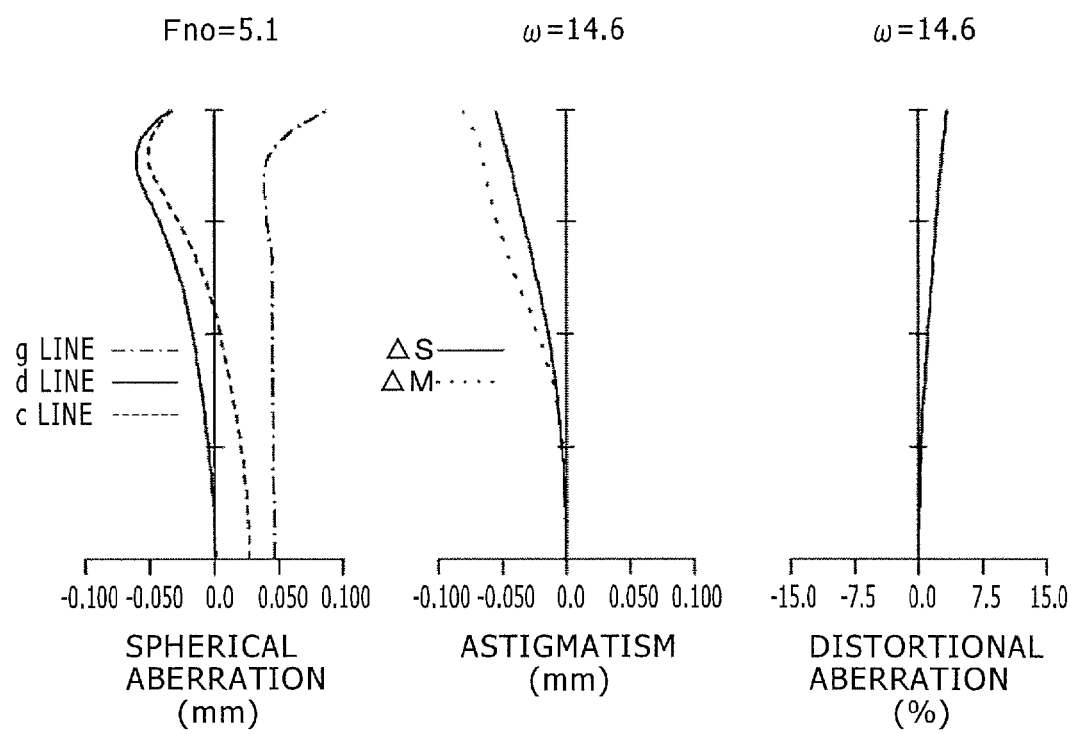

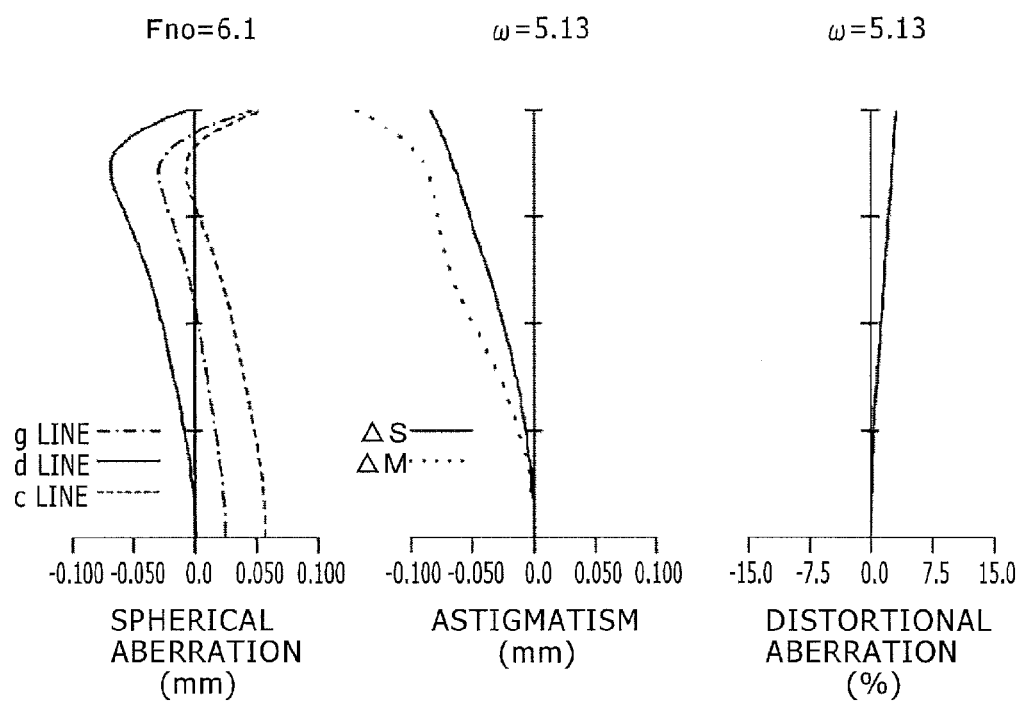

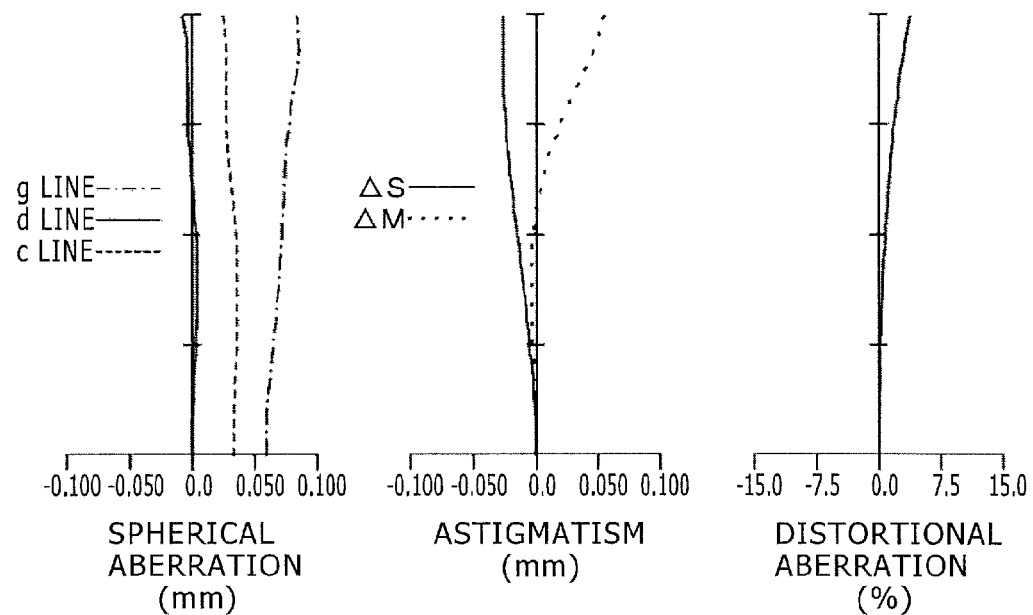

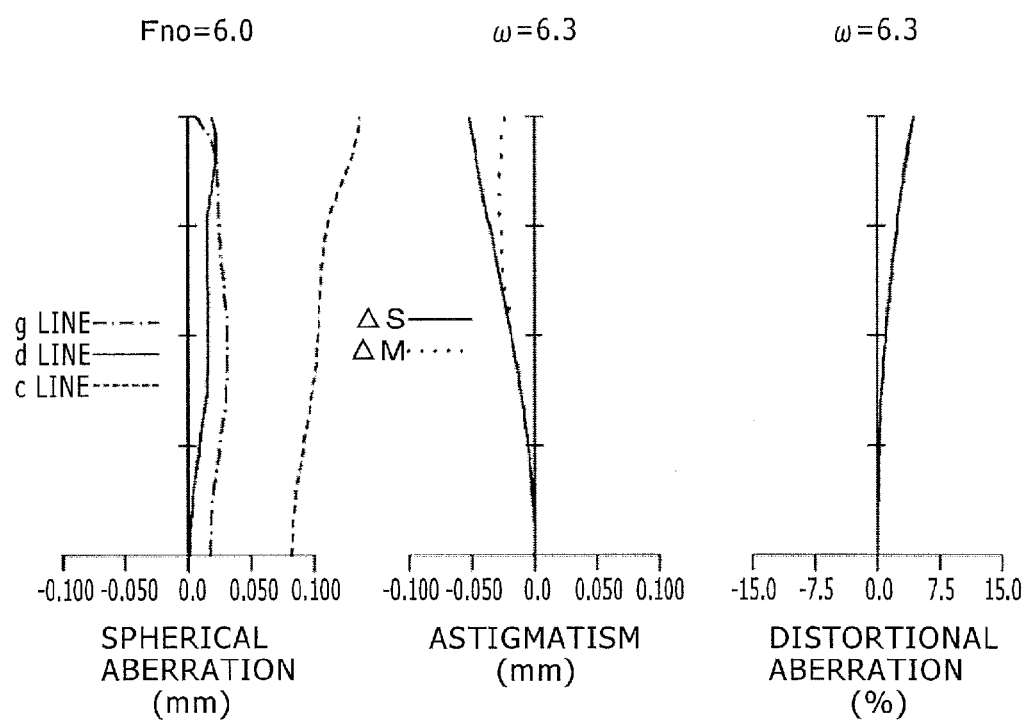

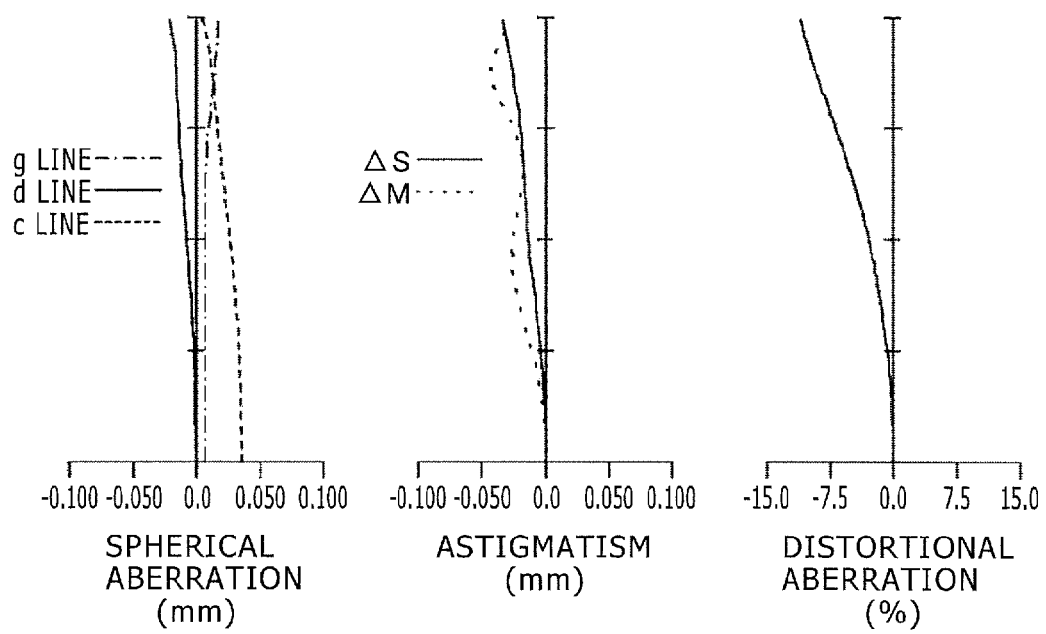

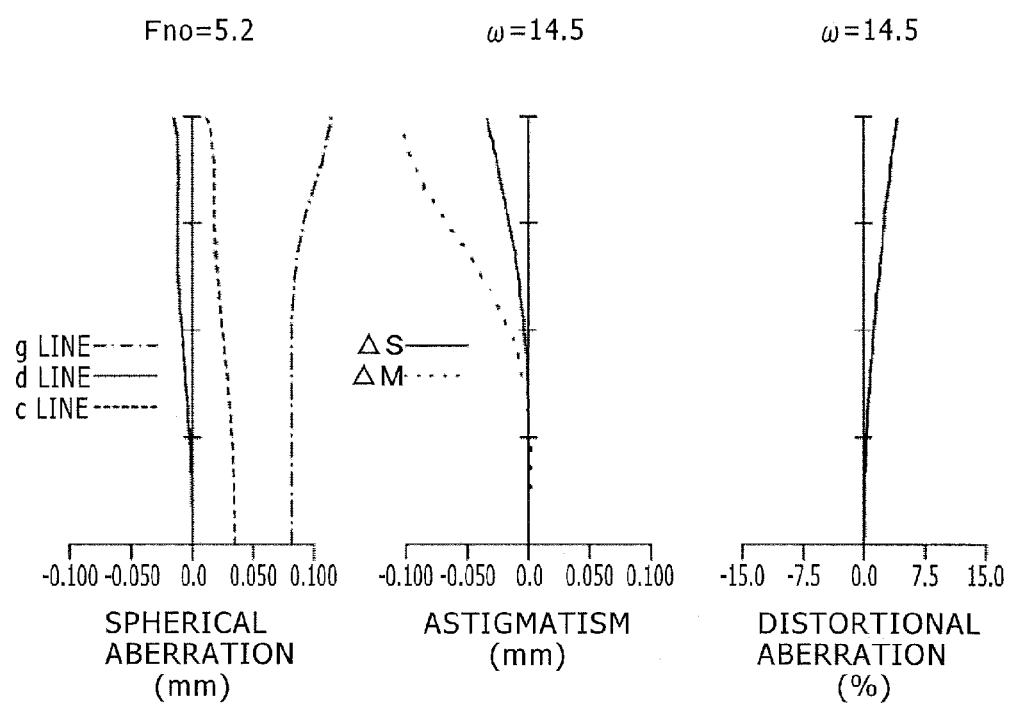

ZOOM LENS AND IMAGING APPARATUS

BACKGROUND

The present technology relates to a zoom lens and an imaging apparatus, and more particularly to a zoom lens suitable as an imaging lens system for use with a small-sized imaging apparatus such as a digital still camera or a video camera for home use and an imaging apparatus which uses the zoom lens.

In recent years, an imaging apparatus which uses a solid-state imaging device such as a digital still camera has become and is becoming widespread. As such a digital still camera as just described becomes widespread, higher picture quality is demanded. Particularly in a digital still camera or a like apparatus which includes a great number of pixels, an imaging lens, particularly a zoom lens, which is superior in an imaging performance corresponding to a solid-state imaging device having a large number of pixels is demanded.

Furthermore, also requests for miniaturization, increase of the angle of view and increase of the magnification ratio are being intensified recently, and a zoom lens which satisfies all of the requests is demanded. Further, in regard to miniaturization, not only reduction of the overall optical length, the front lens diameter and so forth in an imaging state but also reduction of them in a state in which lens groups are accommodated in the camera main body, namely, in a collapsed state, are demanded simultaneously.

Although various types of zoom lenses for a digital still camera are available, a zoom lens of a four-group configuration including a combination described below is known as a lens type suitable for miniaturization and increase of the magnification. In particular, a zoom lens is known which includes a first lens group having a positive refracting power, a second lens group having a negative refracting power, a third lens group having a positive refracting power and a fourth lens group having a positive refracting power. A zoom lens of the type described is disclosed, for example, in Japanese Patent Laid-Open No. 2009-186983.

SUMMARY

In the zoom lens mentioned above, the third lens group is configured from a positive lens and a cemented lens of another positive lens and a negative lens disposed in order from the object side. In such lens arrangement, the principal point of the third lens group is positioned on the object side with respect to an actual position of the third lens group. Therefore, it cannot be avoided to dispose the third lens group at a position spaced far away from the front lens, and where an aperture stop is provided in the proximity of the third lens group, this increases the front lens diameter. Further, since the third lens group is positioned near to the image side, also the exit pupil is positioned near to the image side. This increases the incidence angle of light to the imaging plane, which is not favorable. Further, if it is attempted to widen the angle in such a configuration as just described, then the front lens diameter further increases, resulting in difficulty in achievement of miniaturization. Further, if the two lenses on the image side in the third lens group are formed as a cemented lens as in the case of the zoom lens described above, then there is a limitation to increase of the refracting power of the third lens group from a restriction to aberration correction by a drop in degree of freedom in design. Therefore, this is not suitable for miniaturization and increase in magnification of the zoom lens.

Therefore, it is desirable to provide a zoom lens and an imaging apparatus which have a high imaging performance, have a sufficiently wide angle of view at a wide angle end, have a sufficient magnification ratio, are short in overall optical length, are small in front lens diameter and can achieve miniaturization in a collapsed state.

According to an embodiment of the present technology, there is provided a zoom lens including a first lens group having a positive refracting power, a second lens group having a negative refracting power, a third lens group having a positive refracting power, and a fourth lens group having a positive refracting power, the first, second, third and fourth lens groups being disposed in order from the object side, the lens groups moving upon zooming from a wide angle end to a telephoto end of the zoom lens such that the distance between the first lens group and the second lens group increases while the distance between the second lens group and the third lens group decreases. In the zoom lens, the first lens group is configured from a negative lens having a meniscus shape and a positive lens having a convex face on the opposite sides thereof. The negative lens and the positive lens are disposed in order from the object side. The second lens group is configured from a negative lens, another negative lens having a concave face on the opposite sides thereof, and a positive lens. The negative lenses and the positive lens are disposed in order from the object side. The third lens group is configured from a positive lens, a negative lens and another positive lens disposed in order from the object side. The fourth lens group is configured from a positive lens.

The zoom lens may satisfy the following conditional expression (a):

$$0.95 < |F2/FW| < 1.25 \tag{a}$$

where F2 is the focal length of the second lens group, and FW the focal length of the zoom lens at the wide angle end.

The zoom lens may satisfy the following conditional expression (b):

$$0.75 < |\beta 3W| < 1.0 \tag{b}$$

where $\beta 3W$ is the lateral magnification of the third lens group at the wide angle end.

The zoom lens may satisfy the following conditional expression (c):

$$0.9 < L2/IM < 1.3 \tag{c}$$

where L2 is the distance from the vertex of the object side face of the negative lens on the object side in the second lens group to the vertex of the image side face of the positive lens, and IM is a maximum image height within a recording range on the image plane.

The zoom lens may satisfy the following conditional expression (d):

$$6.0 < |\text{Tan}(\omega W)/\text{Tan}(\omega T)| < 16.0 \tag{d}$$

where $\omega W$ is the half angle of view of the zoom lens at the wide angle end, and $\omega T$ is the half angle of view of the zoom lens at the telephoto end.

The zoom lens may satisfy the following conditional expression (e):

$$5.0 < F1/FW < 7.5 \tag{e}$$

where F1 is the focal length of the first lens group, and FW the focal length of the zoom lens at the wide angle end.

The zoom lens may satisfy the following conditional expression (f):

$$1.0 < |LT/FT| < 1.5 \tag{f}$$

where Lt is the overall optical length at the telephoto end of the zoom lens, and FT the focal length of the zoom lens at the telephoto end.

The zoom lens may satisfy the following conditional expression (g):

$$0.5 < F1/FT < 1.2 \quad (g)$$

where F1 is the focal length of the first lens group, and FT the focal length of the zoom lens at the telephoto end.

The zoom lens may satisfy the following conditional expression (h):

$$2.1 < |\beta 3T/\beta 3W| < 2.6 \quad (h)$$

where $\beta 3T$ is the lateral magnification of the third lens group at the telephoto end, and $\beta 3W$ is the lateral magnification of the third lens group at the wide angle end.

The zoom lens may be configured such that the negative lens and the positive lens of the first lens are joined together to form a cemented lens, and the second negative lens and the third positive lens from the object side in the second lens group are not joined together.

The image side face of the positive lens of the first lens group and the object side face and the image side face of the negative lens positioned on the most object side in the second lens group may have an aspheric face shape.

The zoom lens may further include an aperture stop provided between the second lens group and the third lens group and movable, upon zooming, integrally with the third lens group such that an F value is defined at each zoom position.

The positive lens on the object side and the negative lens of the third lens group may be formed as a cemented lens wherein the lenses are joined together.

The zoom lens may be configured such that, upon focusing on an object, only the fourth lens group moves, and the zoom lens satisfies the following conditional expression (i):

$$0.2 < FM/FT < 0.8 \quad (i)$$

where FM is the focal length of the fourth lens group at the zoom position at which the positive lens of the fourth lens group is positioned nearest to the image side upon focusing on an infinitely remotely positioned object, and FT the focal length of the zoom lens at the telephoto end.

According to another embodiment of the present technology, there is provided an imaging apparatus including a zoom lens including a first lens group having a positive refracting power, a second lens group having a negative refracting power, a third lens group having a positive refracting power, and a fourth lens group having a positive refracting power, the first, second, third and fourth lens groups being disposed in order from the object side, the lens groups moving upon zooming from a wide angle end to a telephoto end of the zoom lens such that the distance between the first lens group and the second lens group increases while the distance between the second lens group and the third lens group decreases, and an imaging device configured to convert an optical image formed by the zoom lens into an electric signal. The first lens group is configured from a negative meniscus lens and a positive lens having a convex face on the opposite sides thereof, the negative lens and the positive lens being disposed in order from the object side. The second lens group is configured from a negative lens, another negative lens having a concave face on the opposite sides thereof, and a positive lens, the negative lenses and the positive lens being disposed in order from the object side. The third lens group is configured from a positive lens, a negative lens and another positive lens disposed in order from the object side. The fourth lens group is configured from a positive lens.

The present technology can achieve superior advantages that the zoom lens has a high imaging performance, has a sufficiently wide angle of view at a wide angle end, has a sufficient magnification ratio, is short in overall optical length, is small in front lens diameter and can achieve miniaturization in a collapsed state.

The above and other features and advantages of the present technology will become apparent from the following description and the appended claims, taken in conjunction with the accompanying drawings in which like parts or elements denoted by like reference characters.

BRIEF DESCRIPTION OF THE DRAWINGS

FIGS. 3A to 3C are diagrammatic views illustrating aberrations at an intermediate standard focal length between a wide angle end and a telephoto end of the zoom lens of FIGS. 1A to 1C;

FIGS. 4A to 4C are diagrammatic views illustrating aberrations at a long focal length end of the zoom lens of FIGS. 1A to 1C;

FIGS. 7A to 7C are diagrammatic views illustrating aberrations at an intermediate standard focal length between a wide angle end and a telephoto end of the zoom lens of FIGS. 5A to 5C;

FIGS. 8A to 8C are diagrammatic views illustrating aberrations at a long focal length end of the zoom lens of FIGS. 5A to 5C;

FIGS. 10A to 10C are diagrammatic views illustrating aberrations at a short focal length end of the zoom lens of FIGS. 9A to 9C;

FIGS. 11A to 11C are diagrammatic views illustrating aberrations at an intermediate standard focal length between a wide angle end and a telephoto end of the zoom lens of FIGS. 9A to 9C;

DETAILED DESCRIPTION OF THE PREFERRED EMBODIMENTS

Figure 1A:
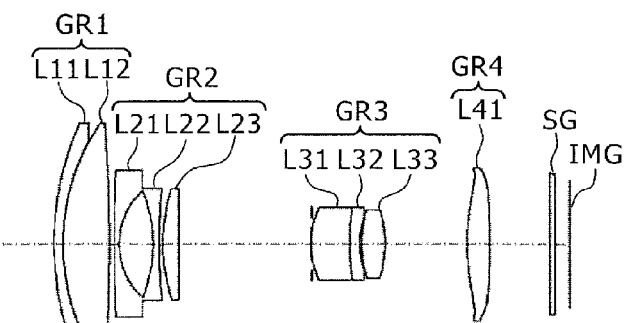
FIGS. 1A to 1C are schematic views showing a lens configuration of a zoom lens according to a first embodiment of the present technology.

The zoom lens according to the present disclosure includes a first lens group GR1 having a positive refracting power, a second lens group GR2 having a negative refracting power, a third lens group GR3 having a positive refracting power and a fourth lens group GR4 having a positive refracting power, disposed in order from the object side along an optical axis. Upon zooming from a wide angle end to a telephoto end, the lens groups move such that the distance between the first lens group GR1 and the second lens group GR2 increases while the distance between the second lens group GR2 and the third lens group GR3 decreases. The first lens group GR1 is configured from a negative meniscus lens L11 and a positive lens L12 having a convex face on the opposite sides thereof, disposed in order from the object side. The second lens group GR2 is configured from a negative lens L21, a negative lens L22 having a concave face on the opposite sides thereof, and a positive lens L23, disposed in order from the object side. The third lens group GR3 is configured from a positive lens L31, a negative lens L32 and another positive lens L33 disposed in order from the object side. The fourth lens group GR4 is configured from a positive lens L41.

Upon zooming, the distance between the first lens group GR1 and the second lens group GR2 varies to vary the lateral magnification of the second lens group GR2. Further, upon zooming, also the distance between the second lens group GR2 and the third lens group GR3, which principally takes charge of an imaging action of the zoom lens, varies, and consequently, the degree of freedom in zooming burden on the lens groups is improved and a high magnification ratio can be implemented with a small size. Further, upon zooming, also the distance between the third lens group GR3 and the fourth lens group GR4 varies. Consequently, a zooming action is provided also with the fourth lens group GR4, and not only further miniaturization can be achieved, but also it is possible to effectively suppress a variation of the field curvature caused by zooming and so forth.

Since the first lens group GR1 has a two-lens configuration including the negative meniscus lens L11 and the positive lens L12 disposed in order from the object side, the first lens group GR1 can be made thinner while the axial chromatic aberration principally on the telephoto end side is suppressed. Further, if the first lens group GR1 can be made thinner, then the distance from the first lens group GR1 to an aperture stop decreases, and the distance between the first lens group GR1 and the entrance pupil decreases inevitably. As a result, a wider angle can be achieved while increase of the front lens diameter is suppressed. Further, if the front lens diameter decreases, then the required edge thickness of the positive lens L12 of the first lens group GR1 further decreases, and further reduction in thickness from that of a zoom lens wherein the first lens group GR1 is configured from three or more lenses can be achieved. Such miniaturization of the first lens group GR1 as described above contributes not only to reduction of the overall optical length and reduction of the front lens diameter but also to miniaturization of the zoom lens in a collapsed state. If the first lens group is configured from three lenses, then since the entrance pupil is spaced from the object side face of the zoom lens, the front lens diameter increases. Further, in this instance, the center thickness of the first lens group on the optical axis cannot be reduced, and therefore, the three-lens configuration of the first lens group is not suitable for miniaturization in a collapsed state. Further, in this instance, if it is tried to widen the angle, then the front lens diameter further increases, and therefore, this is not suitable for widening of the angle.

The second lens group GR2 is configured from a negative lens L21, a negative lens L22 having a concave face on the opposite sides thereof, and a positive lens L23, disposed in order from the object side. By forming the second lens group GR2, which has a negative refracting power on the whole, in such a three-lens configuration as described above, even if the zoom lens has a high magnification ratio equal to or higher than six times, the field curvature and the chromatic aberration of magnification at the wide angle end and the spherical aberration at the telephoto end can suppressed.

The third lens group GR3 is configured from a positive lens L31, a negative lens L32 and another positive lens L33 disposed in order from the object side. Since the third lens group GR3 is arranged in this manner, the spherical aberration and the field curvature over an overall range from the wide angle end to the telephoto end can be corrected favorably. Further, if the aperture stop is disposed on the object side of the third lens group GR3, then the entrance pupil position is spaced from the image plane, and the angle of incidence of light to the image plane can be made small. Consequently, a drop of the light amount and appearance of a false color at a peripheral portion of the imaging region can be reduced. If the third lens group is configured otherwise from four or more lenses, then the center thickness of the third lens group cannot be made thin, and therefore, this configuration is not suitable for miniaturization in a collapsed state.

The fourth lens group GR4 is configured from a single positive lens and corrects a variation of the imaging position upon zooming and a variation of various aberrations. Further, since the fourth lens group GR4 is configured from a single small-sized lens, it is light in weight and is suitably used for focusing upon various object distances.

By forming the lens groups in such a configuration as described above, even where the zoom lens has a magnification of six times or more, the spherical aberration, field curvature and distortional aberration in various zoom regions can be corrected appropriately. Further, the overall optical length and the front lens diameter can be reduced. Further, since the zoom lens is configured from totaling nine lenses, also miniaturization in a collapsed state can be implemented.

Further, the zoom lens according to the present disclosure preferably satisfies the following conditional expression (a):

$$0.95<|F2/FW|<1.25 \qquad (a)$$

where F2 is the focal length of the second lens group GR2, and FW the focal length of the zoom lens at the wide angle end.

The conditional expression (a) normalizes the focal length of the second lens group GR2 with the focal length at the wide angle end. In order to achieve reduction of the overall length of the optical axis while aberrations are corrected sufficiently, it is necessary to appropriately distribute the focal lengths of the lens groups. However, among them, the focal length of the second lens group GR2 which is a so-called zooming group preferably remains within the range of the conditional expression. If the refracting power of the second lens group GR2 becomes excessively high exceeding the upper limit of the conditional expression (a), then the field curvature at the telephoto end becomes excessively great, and increase in magnification while the imaging performance is maintained becomes difficult. On the other hand, if the refracting power of the second lens group GR2 becomes excessively small below the lower limit of the conditional expression (a), then the refracting power for zooming becomes low, which is not suitable for reduction of the overall optical length. Further, since the entrance pupil position is spaced away from the object position of the first lens group GR1, the front lens diameter comes to increase.

It is to be noted that, in the zoom lens of the present disclosure, the numerical value range of the conditional expression (a) is more preferably set to the range of the following conditional expression (a'):

$$1.00<|F2/FW|<1.20 \qquad (a')$$

Further, the zoom lens of the present disclosure more preferably satisfies the following conditional expression (b):

$$0.75<|\beta 3W|<1.0 \qquad (b)$$

where β3W is the lateral magnification of the third lens group GR3 at the wide angle end.

The conditional expression (b) defines an absolute value of the lateral magnification of the third lens group GR3 at the wide angle end. If the absolute value of the lateral magnification of the third lens group GR3 at the wide angle end becomes excessively high exceeding the upper limit of the conditional expression (b), then the absolute value of the lateral magnification at the telephoto end becomes excessively high. Therefore, a spherical aberration, a chromatic aberration and a field curvature caused by the first lens group GR1 and the second lens group GR2 at the telephoto end are expanded by a great amount by the third lens group GR3, resulting in difficulty in increase in magnification. On the other hand, if the absolute value of the lateral magnification of the third lens group becomes lower than the lower limit of the conditional expression (b), then the distance between the second lens group GR2 and the third lens group GR3 at the wide angle end becomes excessively great, which gives rise to increase of the front lens diameter. Therefore, a wide angle cannot be achieved. Further, since the third lens group comes near to the image side, the angle of incidence of light to the image plane becomes excessively great, and consequently, decrease of the light amount and appearance of a false color at a peripheral portion of the imaging plane are liable to occur.

It is to be noted that, in the zoom lens of the present disclosure, the numerical value range of the conditional expression (b) is preferably set to a range given by the following expression (b'):

$$0.80<|\beta 3W|<1.05 \tag{b'}$$

Further, the zoom lens of the present disclosure more preferably satisfies the following conditional expression (c):

$$0.9<L2/IM<1.3 \tag{c}$$

where L2 is the distance from the vertex of the object side face of the negative lens L21 on the object side in the second lens group GR2 to the vertex of the image side face of the positive lens L23, and IM is the maximum image height within a recording range on the image plane.

The conditional expression (c) defines the distance from the vertex of the object side face of the negative lens L21 to the vertex of the image side face of the positive lens L23 of the second lens group GR2, namely, the center thickness of the second lens group GR2 on the optical axis. IM is the maximum image height within the recording range on the image plane of the zoom optical system, namely, an image height to which a flux of light of the maximum angle of view comes. In the case of a zoom optical system wherein the maximum image height differs in different zoom regions of the zoom lens, the maximum image height IM is the maximum image height at the telephoto end.

In the zoom lens of the present disclosure, if the conditional expression (c) is satisfied, then aberration correction optimum to the lens configuration of the lens groups described above can be achieved while the refracting power for required zooming is maintained. Consequently, reduction of the overall optical length and reduction of the front lens diameter can be implemented. In particular, if L2 becomes small below the lower limit of the conditional expression (c), then the second lens group GR2 becomes excessively thin, and if a field curvature, a magnification chromatic aberration and so forth are corrected, then it becomes difficult to obtain a desired refracting power. Further, if the curvature of the negative lens L21 in the second lens group GR2 is reduced for reduction in thickness, then the refracting power of the second lens group GR2 is reduced, and consequently, the overall optical length and the front lens diameter increase. On the other hand, if L2 exceeds the upper limit of the conditional expression (c), then the second lens group GR2 becomes excessively thick, and the air distance for zooming decreases and the overall optical length increases. Further, increase in dimension in the thicknesswise direction of the second lens group GR2 in a collapsed state is caused inevitably.

It is to be noted that, in the zoom lens of the present disclosure, the numerical value range of the conditional expression (c) is more preferably set to a range given by the following expression (c'):

$$1.0<(L21-L23)/IM<1.2 \tag{c'}$$

Further, the zoom lens of the present disclosure more preferably satisfies the following conditional expression (d):

$$6.0<|\mathrm{Tan}(\omega W)/\mathrm{Tan}(\omega T)|<16.0 \tag{d}$$

where ωW is the half angle of view of the zoom lens at the wide angle end, and ωT is the half angle of view of the zoom lens at the telephoto end.

The conditional expression (d) defines the ratio between the angle of view at the telephoto end and the angle of view at the wide angle end to a range within which the effect of the present technology is exhibited particularly remarkably. If the ratio of the angle of view becomes excessively high exceeding the upper limit of the conditional expression (d), then in the lens configuration in the present disclosure, it becomes difficult to implement good aberration correction in the overall zoom region. On the other hand, if the ratio of the angle of view becomes lower than the lower limit of the conditional expression (d), then the zoom lens of the present disclosure cannot implement a desired high magnification intended thereby and the lens configurations sometimes become out of such optimum configurations as described above.

It is to be noted that, in the zoom lens of the present disclosure, the numerical value range of the conditional expression (d) is more preferably set to a range defined by the following expression (d'):

$$7.0<|\mathrm{Tan}(\omega W)/\mathrm{Tan}(\omega T)|<14.0 \tag{d'}$$

Further, the zoom lens of the present disclosure more preferably satisfies the following conditional expression (e):

$$5.0<F1/FW<7.5 \tag{e}$$

where F1 is the focal length of the first lens group GR1, and FW the focal length of the zoom lens at the wide angle end.

The conditional expression (e) normalizes the focal length of the first lens group GR1 with the focal length at the wide angle end. If the focal length of the first lens group GR1 becomes excessively great exceeding the upper limit of the conditional expression (e), then the zooming action caused by the variation of the distance between the first lens group GR1 and the second lens group GR2 becomes weak. Consequently, it becomes difficult to achieve a high magnification ratio. On the other hand, if the focal length of the first lens group GR1 becomes excessively small below the lower limit of the conditional expression (e), then the spherical aberration and the on-axis chromatic aberration principally at the telephoto end arising from the first lens group GR1 become great. Since the aberrations increase in proportion to increase of the magnification ratio, a high magnification ratio becomes difficult to achieve.

It is to be noted that, in the zoom lens of the present disclosure, the numerical value range of the conditional expression (e) is more preferably set to a range defined by the following expression (e'):

$$5.0<|F1/FW|<6.5 \tag{e'}$$

Further, the zoom lens of the present disclosure more preferably satisfies the following conditional expression (f):

$$1.0<|LT/FT|<1.5 \tag{f}$$

where LT is the overall optical length of the zoom lens at the telephoto end, and FT the focal length of the zoom lens at the telephoto end.

The conditional expression (f) is a telephoto ratio representative of a ratio of the overall optical length of the zoom lens at the telephoto end to the focal length at the telephoto end. The overall optical length here is, as generally interpreted, the distance on the optical axis from the face vertex of the first lens group GR1 on the object side to the image side focus. That the telephoto ratio becomes excessively high exceeding the upper limit of the conditional expression (f) signifies that increase of the overall optical length at the telephoto end and disturbs achievement of desired miniaturization. On the other hand, that the telephoto ratio becomes lower than the lower limit of the conditional expression (f) signifies that the overall optical length at the telephoto end becomes excessively short. Accordingly, if such an overall optical length is applied, then since the refracting power of the first lens group GR1 and the second lens group GR2 becomes excessively high, and consequently, it becomes difficult to achieve correction of a spherical aberration and an on-axis chromatic aberration at the telephoto end.

Further, the zoom lens of the present disclosure more preferably satisfies the following conditional expression (g):

$$0.5 < F1/FT < 1.2 \quad (g)$$

where F1 is the focal length of the first lens group GR1, and FT the focal length of the zoom lens at the telephoto end.

The conditional expression (g) normalizes the focal length of the first lens group GR1 with the focal length at the telephoto end. If the focal length of the first lens group GR1 becomes excessively great exceeding the upper limit of the conditional expression (g), then the zooming action caused by a variation of the distance between the first lens group GR1 and the second lens group GR2 becomes weak. Consequently, it becomes difficult to achieve a desired high magnification ratio. On the other hand, if the focal length of the first lens group GR1 becomes small below the lower limit of the conditional expression (g), then a spherical aberration and an on-axis chromatic aberration principally at the telephoto end which arises from the first lens group GR1 increase. Since such aberrations increase together with increase of the magnification ratio, it becomes difficult to achieve a high magnification ratio.

It is to be noted that, in the zoom lens of the present disclosure, the numerical value range of the conditional expression (g) is more preferably set to a range defined by the following expression (g'):

$$0.6 < F1/FT < 1.1 \quad (g')$$

Further, the zoom lens of the present disclosure more preferably satisfies the following conditional expression (h):

$$2.1 < |\beta 3T/\beta 3W| < 2.6 \quad (h)$$

where $\beta 3T$ is the lateral magnification of the third lens group GR3 at the telephoto end, and $\beta 3W$ is the lateral magnification of the third lens group GR3 at the wide angle end.

The conditional expression (h) is the absolute value of a ratio between the lateral magnification at the telephoto end and the lateral magnification at the wide angle end of the third lens group GR3. That the absolute value of the ratio becomes high exceeding the upper limit of the conditional expression (h) represents that the zooming action of the third lens group GR3 becomes excessively high and gives rise to increase of the amount of movement of the third lens group GR3. Therefore, reduction of the overall optical length becomes difficult.

Further, where a diaphragm is disposed between the second lens group GR2 and the third lens group GR3, the variation of the F value becomes excessively great upon moving from the wide angle end to the telephoto end, resulting in difficulty to assure a desired aperture ratio at the telephoto end. Or, an additional mechanism such as a variable diaphragm for assuring the aperture ratio is required, resulting in increase in scale of the mechanism. That the absolute value of the ratio described above becomes smaller than the lower limit of the conditional expression (h) represents that the zooming action of the third lens group GR3 becomes excessively low. Accordingly, since the burden of the zooming action by variation of the distance between the first lens group GR1 and the second lens group GR2 becomes high, the overall optical length increases. Furthermore, if the variation of the distance between the first lens group GR1 and the second lens group GR2 becomes excessively great, then also the variation of the field curvature upon zooming becomes great, and it becomes difficult to assure a desired imaging performance.

Preferably, the zoom lens of the present disclosure is configured such that the negative lens L11 and the positive lens L12 are joined together to form a cemented lens while the negative lens L22 and the positive lens L23 are not joined together. In the case where the negative lens L11 and the positive lens L12 which configure the first lens group GR1 are not joined together, eccentricity between the lenses is likely to occur, and an eccentric aberration which gives rise to asymmetry principally of the field curvature and the magnification chromatic aberration becomes likely to occur. Further, since the principal point position of the first lens group GR1 comes to the image side with respect to the actual position of the lens group, where the first lens group GR1 is configured with the same refracting power, the overall length thereof increases. In the case where the negative lens L11 and the positive lens L12 are formed as a cemented lens wherein they are joined together, the eccentric aberration of the lenses can be suppressed. In addition, alignment of eccentrically moving the cemented lens, which is formed from the negative lens L11 and the positive lens L12 as a unitary member, to correct the eccentric aberration generated over the overall zoom lens is facilitated. Further, by configuring the negative lens L22 and the positive lens L23 in a separate relationship from each other, the degree of freedom in aberration correction at the air distance between the negative lens L22 and the positive lens L23 is improved. Therefore, the off-axis aberration at the wide angle end and the on-axis and off-axis aberrations at the telephoto end can be corrected effectively.

More preferably, the zoom lens of the present disclosure has an aspheric face shape at the image side face of the positive lens L12 and the object side face and the image side face of the negative lens L21. Where the image side face of the positive lens L12 is formed in an aspheric face shape, even where the first lens group GR1 has a configuration which includes only two lenses, it is easy to correct the monochromatic aberration on the telephoto side, particularly the spherical aberration and the field curvature and reduction of the overall optical length and the overall length in a collapsed state is facilitated. By forming the opposite faces of the negative lens L21 on the object side and the image side in an aspheric face shape, even if the refracting power of the negative lens L21 is strengthened, a correction effect of the distortional aberration and the field curvature on the wide angle side can be maintained and achieving a wide angle over the imaging angle of view of 70 degrees becomes comparatively easy. Also, since the refracting power of the entire second lens group GR2 is improved and the amount of movement of the lens groups upon zooming decreases, reduction of the overall optical length can be achieved.

Further, the zoom lens of the present disclosure is more preferably configured such that an aperture stop which defines the F value at each zoom position is provided between the second lens group GR2 and the third lens group GR3 and, upon zooming, the aperture stop moves integrally with the third lens group GR3. The aperture as an iris which defines the F value at each zoom position is preferably disposed between the second lens group GR2 and the third lens group GR3, and if the aperture is disposed in the proximity of the third lens group GR3, then this is effective in suppression of the spherical aberration and coma aberration on the wide angle side. Particularly, if the aperture is configured for movement together with a mechanical section which holds the third lens group GR3 thereon upon zooming, then there is no necessity for an additional mechanical section for moving the iris. This is preferable to miniaturization.

The zoom lens in the present disclosure is more preferably configured such that the positive lens L31 and the negative lens L32 of the third lens group GR3 are formed as a cemented lens wherein they are joined together. By forming the positive lens L31 and the negative lens L32 so as to be joined together and joining them together, it becomes easy to correct the on-axis aberration over the overall zoom region, and also assembly is facilitated.

Further, the zoom lens of the present disclosure is more preferably configured such that only the fourth lens group GR4 is moved upon focusing on the object. By using the fourth lens group GR4 as a lens group for focusing, interference of the same with a driving system for carrying out driving control of a shutter unit or an iris unit or a vibration controlling driving system for shifting the lens groups can be avoided readily, and miniaturization can be anticipated. It is to be noted that the positive lens L41 more preferably has an aspheric shape for obtaining a degree of freedom in aberration correction. Further, the positive lens L41 is more preferably molded from a resin material to achieve reduction in weight and cost.

Further, the zoom lens of the present disclosure more preferably satisfies the following conditional expression (i):

$$0.2 < FM/FT < 0.8 \quad (i)$$

where FM is the focal length of the fourth lens group GR4 at the zoom position at which the positive lens L41 of the fourth lens group GR4 is positioned nearest to the image side upon focusing on an infinitely remotely positioned object, and FT the focal length of the zoom lens at the telephoto end.

The conditional expression (i) represents the ratio between the focal length at the telephoto end and the focal length at a zoom position at which the fourth lens group GR4 is positioned nearest to the image side upon focusing on an infinitely remotely positioned object. If the conditional expression (i) is satisfied, then upon zooming of the zoom lens in a state in which the zoom lens is focused on an infinitely remotely positioned object, the fourth lens group GR4 is positioned on the most image side in an intermediate zoom region other than the wide angle end and the telephoto end. Therefore, the space on the object side of the fourth lens group GR4 upon focusing on an infinitely remotely positioned object can be assured, and consequently, the range of the amount of movement of the fourth lens group GR4 can be reduced. When the ratio is lower than the lower limit of the conditional expression (i), namely, where the zoom lens is of the type wherein the fourth lens group GR4 is positioned nearest to the image side on the wide angle side upon zooming, the fourth lens group GR4 is inevitably positioned on the object side not at the wide angle end but at the telephoto end. Consequently, since the lateral magnification of the fourth lens group GR4 is greater at the telephoto end than at the wide angle end, contribution of the fourth lens group GR4 to zooming disappears, which is not desirable. On the other hand, when the ratio is higher than the upper limit of the conditional expression (i), or in other words, where the zoom lens is of the type wherein the fourth lens group GR4 is positioned nearest to the image side at the telephoto end upon zooming, although the focal length of the entire zoom lens system increases, the focusing sensitivity of the fourth lens group GR4 drops. As a result, since the amount of movement of the fourth lens group GR4 becomes great upon focusing on an infinitely remotely positioned object, miniaturization becomes difficult.

It is to be noted that the focusing sensitivity of the zoom lens in the present disclosure represents a ratio of the amount of movement of an image in the direction of the optical axis to the amount of movement of the fourth lens group GR4, which is a focusing lens group, in the direction of the optical axis.

Further, unless otherwise specified, the focal length, angle of view, entrance pupil position, exit pupil position, lateral magnification and so forth in the present disclosure represent various numerical values with respect to a flux of light of a wavelength of the d line.

Thus, since the imaging apparatus of the present disclosure includes the zoom lens described hereinabove, it has a high imaging performance and can achieve, while it is small in size in both of an imaging state and a collapsed state, an imaging angle of view from approximately 70° to 90° at the wide angle end and a zoom ratio of six times or more.

It is to be noted that, in the zoom lens, one of the first lens group GR1 to the fourth lens group GR4 or some lens of such one lens group can be moved or shifted in a direction substantially perpendicular to the optical axis to shift an image. In this manner, the zoom lens of the present disclosure includes a detection system for moving a lens group or some lens of a lens group in a direction substantially perpendicular to the optical axis to detect a camera shake, a driving system for shifting the lens groups, and a control system for providing a shift amount to the driving system based on an output of the detection system. By combining the detection system, driving system and control system, it is possible to cause the zoom lens to function as a vibration controlling optical system. Particularly, in the zoom lens of the present disclosure, by shifting the entire third lens group GR3 in a direction substantially perpendicular to the optical axis, an image can be shifted with a small amount of aberration variation.

Further, while description is given herein of a zoom lens which includes the first lens group GR1 to the fourth lens group GR4, a lens having substantially no refracting power may be additionally provided. Also in this instance, no influence is had on the performance of the entire zoom lens system.

In the following, embodiments of the present technology are described. The description is given in the following order.

1. First Embodiment (Numerical Value Example 1)
2. Second Embodiment (Numerical Value Example 2)
3. Third Embodiment (Numerical Value Example 3)
4. Application (Imaging Apparatus)

It is to be noted that such symbols as described in various tables and the following description have the following meanings. In particular, FNo. represents the open F value (F number), f the focal length of the entire lens system, ω the half angle of view, ri the radius of curvature of the ith face, di the distance of the ith lens face, ni the refractive index of the glass or material with respect to the d line (wavelength: 587.6 nm) at the ith face, and νi the Abbe number of the ith face. Further, a face represented by "ASP" is an aspheric face, which has a shape represented by the following expression:

$$x = (y^2 \cdot c^2)/(1+(1-(1+\kappa) \cdot y^2 \cdot c^2)^{1/2}) + \Sigma Ai \cdot Yi$$

where x is the distance in the direction of the optical axis from the lens face vertex, y the height in a direction perpendicular to the optical axis, c the paraxial curvature at the lens vertex, κ the conic constant, and Ai the ith aspheric coefficient.

<1. First Embodiment>

Lens Configuration

Figure 1B:
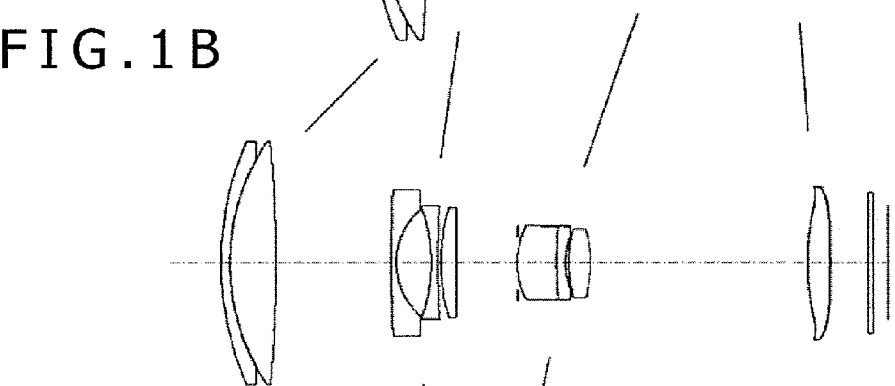
Figure 1C:
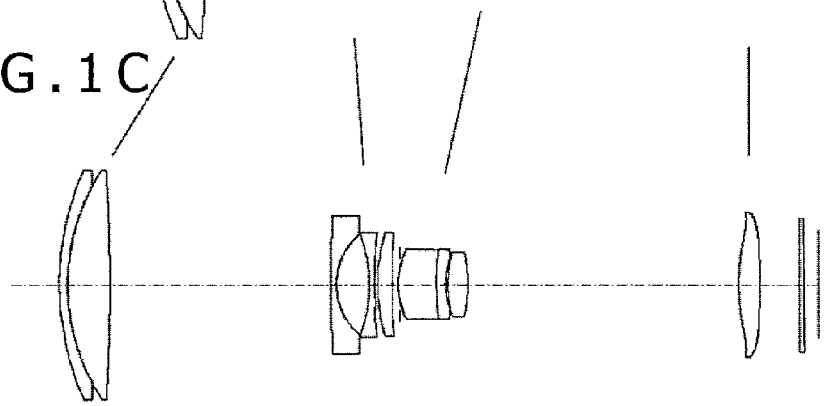

FIGS. 1A to 1C show a lens configuration of a zoom lens according to a first embodiment of the present technology. Referring to FIGS. 1A to 1C, the zoom lens includes a first lens group GR1 having a positive refracting power, a second lens group GR2 having a negative refracting power, a third lens group GR3 having a positive refracting power, and a fourth lens group GR4 having a positive refracting power. The first lens group GR1, second lens group GR2, third lens group GR3 and fourth lens group GR4 are arrayed in order from the object side toward the image plane.

The first lens group GR1 is configured from a cemented lens of a negative lens L11 and a positive lens L12 which has an aspheric face on the image side and has a biconvex shape. The second lens group GR2 is configured from a negative lens L21 having an aspheric face on the opposite sides thereof, another negative lens L22 having a biconcave shape, and a positive lens L23, disposed in order from the object side. A diaphragm is disposed on the object side of the third lens group GR3. The third lens group GR3 is configured from a cemented lens of a positive lens L31 and a negative lens L32, and a positive lens L33 of a biconvex shape. The fourth lens group GR4 is configured from a single positive lens L41 having an aspheric face on the opposite sides thereof and molded from an optical resin. It is to be noted that a seal glass plate SG is disposed between the fourth lens group GR4 and the image plane IMG.

In the present first embodiment, when the lens position varies from the short focal length end to the long focal length end, the distance between the lens groups varies. FIG. 1A illustrates lens positions in a short focal length end state; FIG. 1B illustrates lens positions in a standard focal length end state; and FIG. 1C illustrates lens positions in a long focal length end state.

Various Dimensions of Lenses

Table 1 indicates lens data of a numerical value example 1 where particular numerical values are applied to the zoom lens of the first embodiment.

TABLE 1

| si | | ri | di | ni | vi |
|---|---|---|---|---|---|
| 1 | | 19.406 | 0.60 | 1.8467 | 23.7 |
| 2 | | 14.066 | 2.91 | 1.6188 | 63.8 |
| 3 | ASP | −89.350 | (Variable) | | |
| 4 | ASP | 95.000 | 0.30 | 1.8014 | 45.4 |
| 5 | ASP | 4.590 | 2.27 | | |

TABLE 1-continued

| si | | ri | di | ni | vi |
|---|---|---|---|---|---|
| 6 | | −9.110 | 0.40 | 1.6968 | 55.4 |
| 7 | | 41.300 | 0.23 | | |
| 8 | | 13.010 | 0.99 | 1.9459 | 17.9 |
| 9 | | 211.500 | (Variable) | | |
| 10 | (Diaphragm) | ∞ | −0.35 | | |
| 11 | ASP | 4.869 | 2.60 | 1.8344 | 37.2 |
| 12 | | 18.150 | 0.60 | 1.9229 | 20.8 |
| 13 | | 4.314 | 0.22 | | |
| 14 | | 7.770 | 1.40 | 1.5831 | 59.4 |
| 15 | | −9.790 | (Variable) | | |
| 16 | ASP | 14.884 | 1.46 | 1.5247 | 56.4 |
| 17 | ASP | −58.972 | (Variable) | | |
| 18 | | ∞ | 0.30 | 1.5168 | 64.1 |
| 19 | | ∞ | 1.00 | | |

In the zoom lens in the present first embodiment, the third, fourth, fifth, eleventh, sixteenth and seventeenth faces are configured in an aspheric face shape as described hereinabove. The conic constant κ and the fourth, sixth, eighth and tenth order aspheric coefficients A4, A6, A8 and A10 of the faces mentioned are indicated in Table 2. It is to be noted that, in. Table 2, "E-xx" represents an exponential notation to the base 10. For example, "E-01" represents "$10^{-1}$."

TABLE 2

| | s3 | s4 | s5 | s11 | s16 | s17 |
|---|---|---|---|---|---|---|
| κ | 0 | 0 | 0 | 0 | 0 | 0 |
| A4 | 1.4355E−05 | −2.3596E−05 | −2.1372E−04 | −6.3930E−04 | 9.1687E−05 | 3.1208E−04 |
| A6 | 9.6092E−10 | 3.8225E−06 | 7.1355E−08 | −1.6474E−05 | −1.7831E−05 | −4.1992E−05 |
| A8 | −2.9194E−10 | −2.3109E−07 | 2.3251E−06 | 4.3378E−06 | −6.0418E−07 | 0 |
| A10 | 0 | 0 | −1.4992E−07 | −6.9696E−07 | 0 | 0 |

In the present first embodiment, when the lens position varies from the short focal length end to the long focal length end, the distance between the following lens groups varies. In particular, the distance d3 between the first lens group GR1 and the second lens group GR2, the distance d9 between the second lens group GR2 and the diaphragm, the distance d15 between the third lens group GR3 and the fourth lens group GR4, and the distance d17 between the fourth lens group GR4 and the seal glass plate SG vary. Numerical values of the distances d3, d9, d15 and d17, the focal length f, open F value FNo., half angle ω of view and overall lens length at the short focal length end (f=4.90), standard focal length (f=14.31) and long focal length end (f=41.67) are indicated in Table 3.

TABLE 3

| f | 4.90 | 14.31 | 41.67 |
|---|---|---|---|
| FNo. | 3.34 | 5.06 | 6.09 |
| ω (°) | 39.9 | 14.6 | 5.1 |
| Overall lens length | 33.7 | 43.8 | 52.8 |
| d3 | 0.350 | 7.658 | 15.446 |
| d9 | 8.996 | 4.338 | 0.759 |
| d15 | 5.434 | 14.301 | 18.890 |
| d17 | 3.994 | 2.550 | 2.780 |

Aberrations of Lenses

Figure 2A:
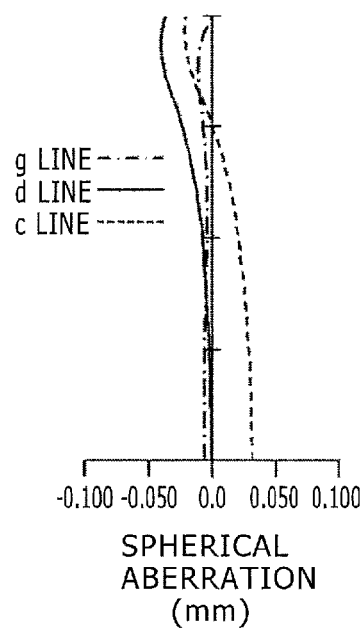
FIGS. 2A to 2C are diagrammatic views illustrating aberrations at a short focal length end of the zoom lens of FIGS. 1A to 1C.
Figure 2B:
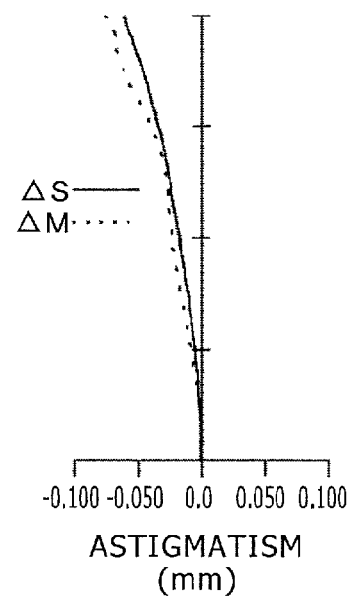
Figure 2C:
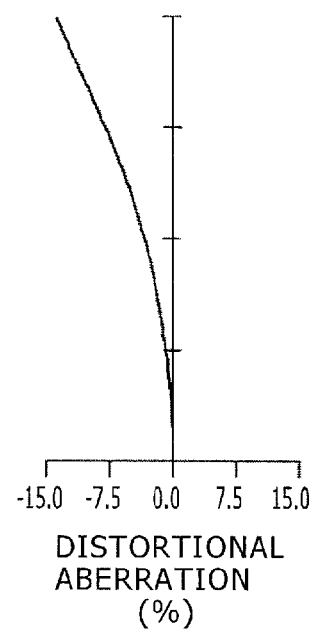

Various aberrations of the zoom lens according to the first embodiment are illustrated in FIGS. 2A to 4C. FIGS. 2A to 2C illustrate aberrations at the short focal length end of the zoom lens; FIGS. 3A to 3C illustrate aberrations at the standard focal length between the wide angle end and the telephoto end of the zoom lens; and FIGS. 4A to 4C illustrate aberrations at the long focal length end of the zoom lens. In FIGS. 2A to 4C, FIGS. 2A, 3A and 4A are spherical aberration diagrams; FIGS. 2B, 3B and 4B are astigmatism diagrams; and FIGS. 2C, 3C and 4C are distortional aberration diagrams.

It is to be noted that, in the spherical aberration diagrams, a solid line curve indicates values on the d line (wavelength: 587.6 nm); a broken line curve indicates values on the c line (wavelength: 656.3 nm); and an alternate long and short dash line curve indicates values on the g line (wavelength: 435.8 nm). Meanwhile, in the astigmatism diagrams, a solid line curve S indicates values on the sagittal image plane; and a broken line curve M indicates values on the meridional image plane.

From the aberration diagrams, it can be recognized apparently that the zoom lens according to the first embodiment has a superior imaging performance in that the aberrations are corrected favorably.

<2. Second Embodiment>
Lens Configuration

Figure 5A:
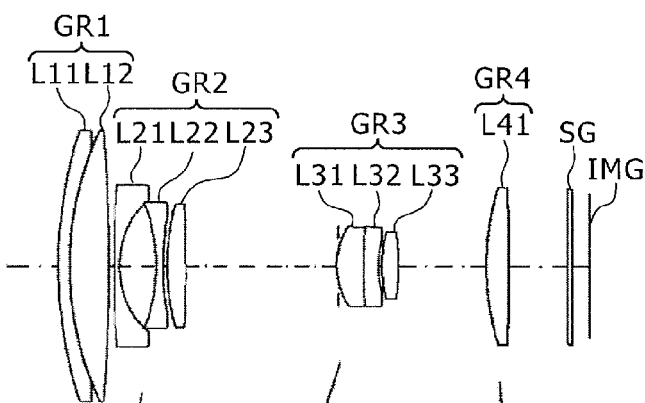
FIGS. 5A to 5C are schematic views showing a lens configuration of a zoom lens according to a second embodiment of the present technology.
Figure 5B:
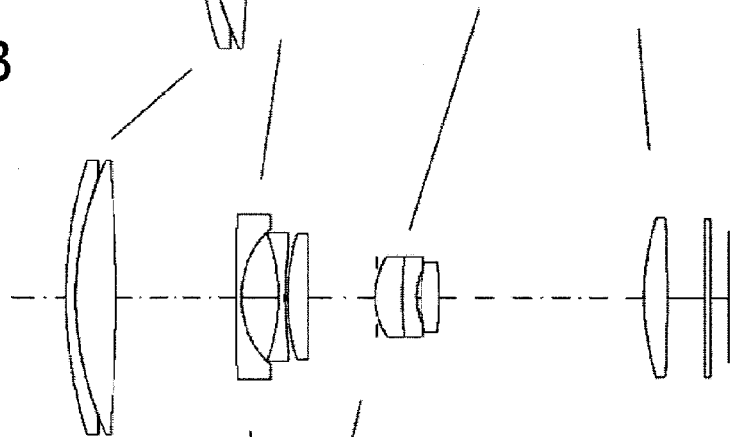
Figure 5C:
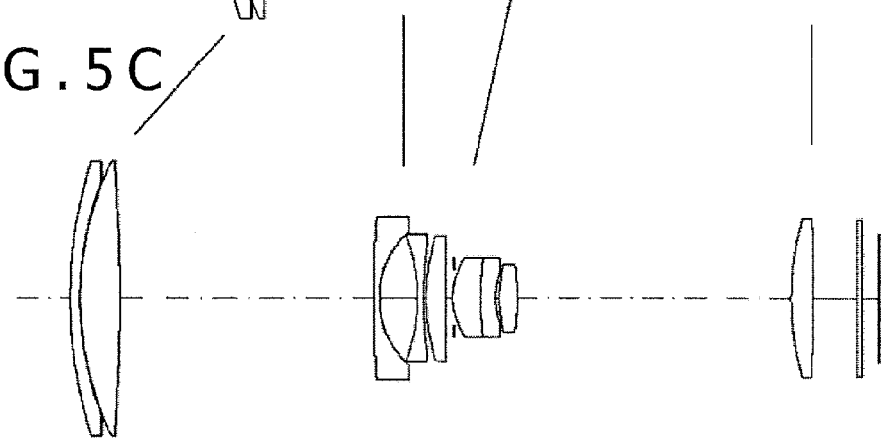

FIGS. 5A to 5C show a lens configuration of a zoom lens according to a second embodiment of the present technology. Referring to FIGS. 5A to 5C, the zoom lens includes a first lens group GR1 having a positive refracting power, a second lens group GR2 having a negative refracting power, a third lens group GR3 having a positive refracting power, and a fourth lens group GR4 having a positive refracting power. The first lens group GR1, second lens group GR2, third lens group GR3 and fourth lens group GR4 are arrayed in order from the object side toward the image plane.

The first lens group GR1 is configured from a cemented lens of a negative lens L11 and a positive lens L12 which has an aspheric face on the image side and has a biconvex shape. The second lens group GR2 is configured from a negative lens L21 having an aspheric face on the opposite sides thereof, a negative lens L22 having a biconcave shape, and a positive lens L23, disposed in order from the object side. A diaphragm is provided on the object side of the third lens group GR3. The third lens group GR3 is configured from a cemented lens of a positive lens L31 and a negative lens L32, and a positive lens L33 of a biconvex shape whose image side face has an aspheric face shape. The fourth lens group GR4 is configured from a single positive lens L41 having a spherical face on the opposite sides thereof. It is to be noted that a seal glass plate SG is disposed between the fourth lens group GR4 and the image plane IMG.

In the present second embodiment, when the lens position varies from the short focal length end to the long focal length end, the distance between the lens groups varies. FIG. 5A illustrates lens positions in a short focal length end state; FIG. 5B illustrates lens positions in a standard focal length end state; and FIG. 5C illustrates lens positions in a long focal length end state.

Various Dimensions of Lenses

Table 4 indicates lens data of a numerical value example 2 where particular numerical values are applied to the zoom lens of the second embodiment.

TABLE 4

| si | | ri | di | ni | vi |
|---|---|---|---|---|---|
| 1 | | 25.805 | 0.60 | 1.9229 | 20.8 |
| 2 | | 17.942 | 2.30 | 1.7290 | 54.0 |
| 3 | ASP | −92.905 | (Variable) | | |
| 4 | ASP | 95.000 | 0.30 | 1.8820 | 37.2 |
| 5 | ASP | 5.386 | 2.14 | | |
| 6 | | −10.748 | 0.40 | 1.6968 | 55.4 |
| 7 | | 20.328 | 0.20 | | |
| 8 | | 12.057 | 1.10 | 1.9459 | 17.9 |
| 9 | | −761.091 | (Variable) | | |
| 10 | (Diaphragm) | ∞ | −0.42 | | |
| 11 | ASP | 4.001 | 1.60 | 1.8344 | 37.2 |
| 12 | | 20.144 | 0.85 | 1.9229 | 20.8 |
| 13 | | 3.897 | 0.25 | | |
| 14 | | 7.929 | 1.00 | 1.5831 | 59.4 |
| 15 | ASP | −13.795 | (Variable) | | |
| 16 | | 15.108 | 1.30 | 1.5311 | 56.0 |
| 17 | | −164.904 | (Variable) | | |
| 18 | | ∞ | 0.30 | 1.5168 | 64.1 |
| 19 | | ∞ | 1.00 | | |

In the zoom lens in the present second embodiment, the third, fourth, fifth, eleventh and fifteenth faces are configured in an aspheric face shape as described hereinabove. The conic constant κ and the fourth, sixth, eighth and tenth order aspheric coefficients A4, A6, A8 and A10 of the faces mentioned are indicated in Table 5.

TABLE 5

| | s3 | s4 | s5 | s11 | s15 |
|---|---|---|---|---|---|
| κ | 0 | 0 | 0 | −0.5502 | 0 |
| A4 | 1.0012E−05 | −4.4657E−04 | −4.5914E−04 | 4.5447E−04 | 1.8041E−03 |
| A6 | −1.2376E−08 | 6.4330E−05 | 6.4576E−05 | 4.0558E−05 | 6.3816E−05 |
| A8 | 0 | −2.9023E−06 | 2.3096E−06 | 6.6794E−07 | 5.1911E−05 |
| A10 | 0 | 4.3012E−08 | −1.4120E−07 | 4.8575E−07 | 0 |

In the present second embodiment, when the lens position varies from the short focal length end to the long focal length end, the distance between the following lens groups varies. In particular, the distance d3 between the first lens group GR1 and the second lens group GR2, the distance d9 between the second lens group GR2 and the diaphragm, the distance d15 between the third lens group GR3 and the fourth lens group GR4, and the distance d17 between the fourth lens group GR4 and the seal glass plate SG vary. Numerical values of the distances d3, d9, d15 and d17, the focal length f, open F value FNo., half angle ω of view and overall lens length at the short focal length end (f=4.91), standard focal length (f=12.80) and long focal length end (f=33.47) are indicated in Table 6.

TABLE 6

| f | 4.91 | 12.80 | 33.47 |
|---|---|---|---|
| FNo. | 3.40 | 4.91 | 5.99 |
| ω (°) | 40.5 | 16.3 | 6.3 |
| Overall lens length | 31.2 | 38.4 | 47.0 |
| d3 | 0.350 | 6.966 | 14.800 |
| d9 | 9.339 | 4.327 | 0.820 |

TABLE 6-continued

| | | | |
|---|---|---|---|
| d15 | 5.150 | 11.982 | 15.978 |
| d17 | 3.432 | 2.207 | 2.482 |

Aberrations of Lenses

Figure 6A:
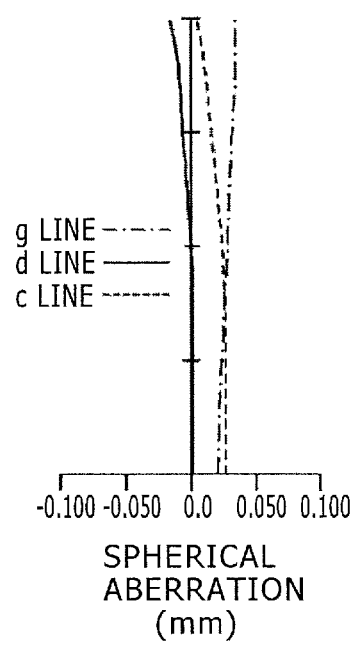
FIGS. 6A to 6C are diagrammatic views illustrating aberrations at a short focal length end of the zoom lens of FIGS. 5A to 5C.
Figure 6B:
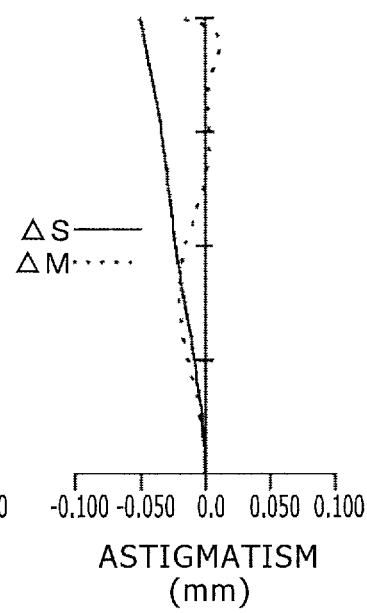
Figure 6C:
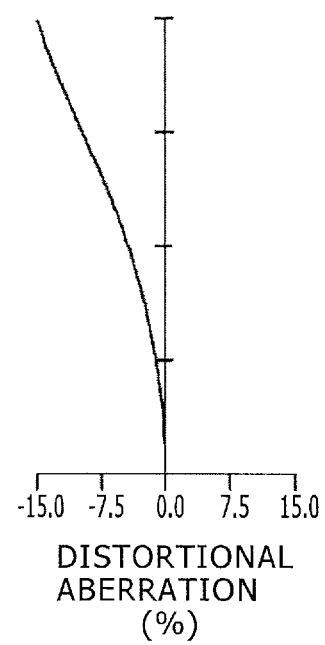

Various aberrations of the zoom lens according to the second embodiment are illustrated in FIGS. 6A to 8C. FIGS. 6A to 6C illustrate aberrations at the short focal length end of the zoom lens; FIGS. 7A to 7C illustrate aberrations at the standard focal length between the wide angle end and the telephoto end of the zoom lens; and FIGS. 8A to 8C illustrate aberrations at the long focal length end of the zoom lens. In FIGS. 6A to 8C, FIGS. 6A, 7A and 8A are spherical aberration diagrams; FIGS. 6B, 7B and 8B are astigmatism diagrams; and FIGS. 6C, 7C and 8C are distortional aberration diagrams. It is to be noted that the types of the lines in the aberration diagrams are similar to those described in the description of the first embodiment.

From the aberration diagrams, it can be recognized apparently that the zoom lens according to the second embodiment has a superior imaging performance in that the aberrations are corrected favorably.

<3. Third Embodiment>

Lens Configuration

Figure 9A:
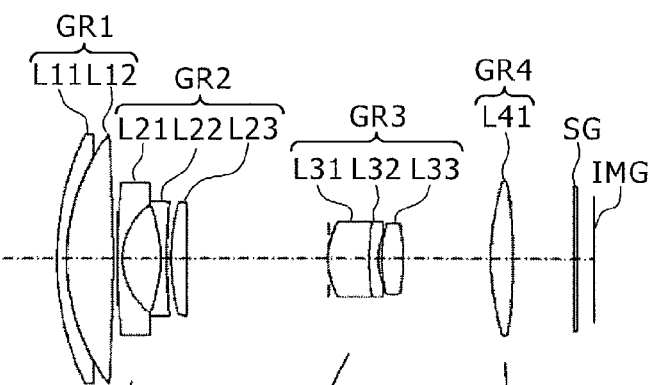
FIGS. 9A to 9C are schematic views showing a lens configuration of a zoom lens according to a third embodiment of the present technology.
Figure 9B:
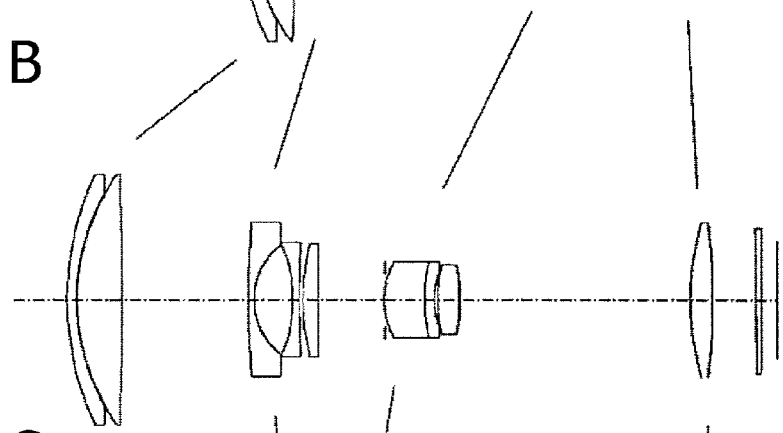
Figure 9C:
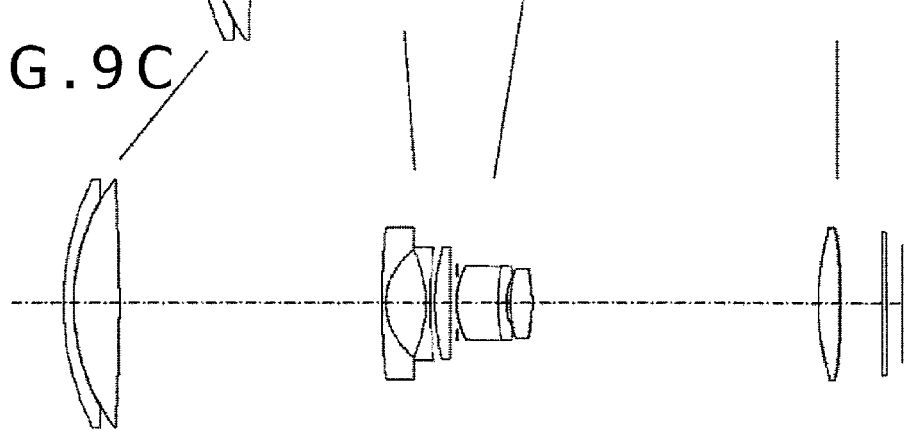

FIGS. 9A to 9C show a lens configuration of a zoom lens according to a third embodiment of the present technology. Referring to FIGS. 9A to 9C, the zoom lens includes a first lens group GR1 having a positive refracting power, a second lens group GR2 having a negative refracting power, a third lens group GR3 having a positive refracting power, and a fourth lens group GR4 having a positive refracting power. The first lens group GR1, second lens group GR2, third lens group GR3 and fourth lens group GR4 are arrayed in order from the object side toward the image plane.

The first lens group GR1 is configured from a cemented lens of a negative lens L11 and a positive lens L12 which has an aspheric face on the image side and has a biconvex shape. The second lens group GR2 is configured from a negative lens L21 having an aspheric face on the opposite sides thereof, a negative lens L22 having a biconcave shape, and a positive lens L23, disposed in order from the object side. A diaphragm is provided on the object side of the third lens group GR3. The third lens group GR3 is configured from a cemented lens of a positive lens L31 and a negative lens L32, and a positive lens L33 of a biconvex shape having an aspheric face shape on the opposite faces thereof. The fourth lens group GR4 is configured from a single positive lens L41 having an aspheric face on one face thereof and molded from an optical resin.

In the present third embodiment, when the lens position varies from the short focal length end to the long focal length end, the distance between the lens groups varies. FIG. 9A illustrates lens positions in a short focal length end state; FIG. 9B illustrates lens positions in a standard focal length end state; and FIG. 9C illustrates lens positions in a long focal length end state.

Various Dimensions of Lenses

Table 7 indicates lens data of a numerical value example 3 where particular numerical values are applied to the zoom lens of the third embodiment.

TABLE 7

| si | | ri | di | ni | vi |
|---|---|---|---|---|---|
| 1 | | 17.963 | 0.60 | 1.9136 | 24.9 |
| 2 | | 13.210 | 2.93 | 1.6188 | 63.8 |
| 3 | ASP | −124.445 | (Variable) | | |
| 4 | ASP | 36.968 | 0.30 | 1.8014 | 45.4 |
| 5 | ASP | 4.051 | 2.44 | | |
| 6 | | −9.073 | 0.40 | 69.6802 | 55.4 |
| 7 | | 52.737 | 0.23 | | |
| 8 | | 12.760 | 0.99 | 1.9459 | 17.9 |
| 9 | | 143.718 | (Variable) | | |
| 10 | (Diaphragm) | ∞ | −0.35 | | |
| 11 | ASP | 4.809 | 2.60 | 1.8344 | 37.2 |
| 12 | | 11.684 | 0.60 | 1.9229 | 18.8 |
| 13 | | 4.286 | 0.22 | | |
| 14 | ASP | 7.531 | 1.40 | 1.5831 | 59.4 |
| 15 | ASP | −11.537 | (Variable) | | |
| 16 | ASP | 14.517 | 1.40 | 1.5163 | 64.0 |
| 17 | ASP | −49.858 | (Variable) | | |
| 18 | | ∞ | 0.30 | 1.5168 | 64.1 |
| 19 | | ∞ | 1.00 | | |

In the zoom lens in the present third embodiment, the third, fourth, fifth, eleventh, fourteenth, fifteenth, sixteenth and seventeenth faces are configured in an aspheric face shape as described hereinabove. The conic constant κ and the fourth, sixth, eighth and tenth order aspheric coefficients A4, A6, A8 and A10 of the faces mentioned are indicated in Table 8.

TABLE 8

| | s3 | s4 | s5 | s11 | s14 | s15 | s16 | s17 |
|---|---|---|---|---|---|---|---|---|
| κ | 0 | 0 | 0 | 0.0405 | 0 | 0 | 0 | 0 |
| A4 | 1.3826E−05 | −5.7967E−04 | −1.0401E−03 | −5.6675E−04 | −2.4000E−04 | 2.5527E−04 | −1.2646E−04 | 3.4377E−05 |
| A6 | −2.2475E−08 | 3.8704E−05 | −3.2352E−05 | −9.1476E−06 | 1.1322E−05 | 3.5403E−05 | 1.8146E−06 | −9.4253E−06 |
| A8 | −2.8327E−11 | −1.3998E−06 | 5.8261E−06 | −2.7049E−06 | 0 | −9.4719E−06 | −2.1019E−07 | 0 |
| A10 | 4.9432E−14 | 1.8071E−08 | −4.7925E−07 | 2.4394E−07 | 0 | 1.5230E−06 | 0 | 0 |

In the present third embodiment, when the lens position varies from the short focal length end to the long focal length end, the distance between the following lens groups varies. In particular, the distance d3 between the first lens group GR1 and the second lens group GR2, the distance d9 between the second lens group GR2 and the diaphragm, the distance d15 between the third lens group GR3 and the fourth lens group GR4, and the distance d17 between the fourth lens group GR4 and the seal glass plate SG vary. Numerical values of the distances d3, d9, d15 and d17, the focal length f, open F value FNo., half angle ω of view and overall lens length at the short focal length end (f=4.65), standard focal length (f=14.31) and long focal length end (f=46.60) are indicated in Table 9.

TABLE 9

| | | | |
|---|---|---|---|
| f | 4.65 | 14.31 | 46.60 |
| FNo. | 3.38 | 5.23 | 6.07 |
| ω (°) | 40.7 | 14.5 | 4.6 |
| Overall lens length | 34.3 | 45.1 | 54.0 |
| d3 | 0.300 | 8.020 | 16.960 |

TABLE 9-continued

| | | | |
|---|---|---|---|
| d9 | 9.135 | 4.177 | 0.413 |
| d15 | 5.947 | 15.117 | 18.880 |
| d17 | 3.853 | 2.752 | 2.700 |

Aberrations of Lenses

Figures 12A, 12B, 12C:
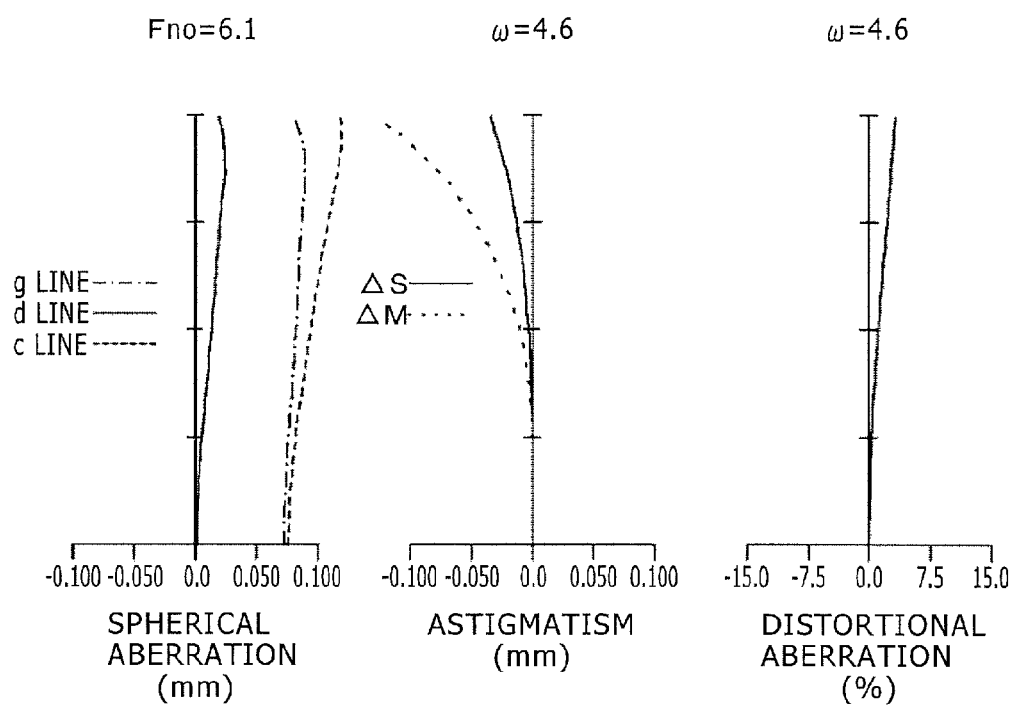
FIGS. 12A to 12C are diagrammatic views illustrating aberrations at a long focal length end of the zoom lens of FIGS. 9A to 9C.

Various aberrations of the zoom lens according to the third embodiment are illustrated in FIGS. 10A to 12C. FIGS. 10A to 10C illustrate aberrations at the short focal length end of the zoom lens; FIGS. 11A to 11C illustrate aberrations at the standard focal length between the wide angle end and the telephoto end of the zoom lens; and FIGS. 12A to 12C illustrate aberrations at the long focal length end of the zoom lens. In FIGS. 10A to 12C, FIGS. 10A, 11A and 12A are spherical aberration diagrams; FIGS. 10B, 11B and 12B are astigmatism diagrams; and FIGS. 10A, 11C and 12C are distortional aberration diagrams. It is to be noted that the types of the lines in the aberration diagrams are similar to those described in the description of the first embodiment.

From the aberration diagrams, it can be recognized apparently that the zoom lens according to the third embodiment has a superior imaging performance in that the aberrations are corrected favorably.

Summary of Conditional Expressions

Table 10 indicates various values in the numerical value examples 1 to 3 of the first to third embodiment. As apparently recognized from the values, they satisfy the conditional expressions (a) to (i).

TABLE 10

| | | Numerical value example 1 | Numerical value example 2 | Numerical value example 3 |
|---|---|---|---|---|
| | Tan (ωW) | 0.84 | 0.85 | 0.86 |
| | Tan (ωT) | 0.09 | 0.11 | 0.08 |
| | FW | 4.91 | 4.91 | 4.65 |
| | FT | 41.67 | 33.47 | 46.60 |
| | F1 | 29.27 | 30.66 | 29.79 |
| | F2 | −5.177 | −5.787 | −5.002 |
| | L21-L23 | 4.18 | 4.14 | 4.36 |
| | IM | 3.882 | 3.882 | 3.882 |
| | β3W | −0.95 | −0.80 | −0.94 |
| | β3T | −2.26 | −1.93 | −2.18 |
| | LT | 52.80 | 47.00 | 54.00 |
| | FM | 14.31 | 12.80 | 24.45 |
| Exp. (a) | |F2/FW| | 1.06 | 1.18 | 1.08 |
| Exp. (b) | |β3W| | 0.95 | 0.80 | 0.94 |
| Exp. (c) | L2/IM | 1.08 | 1.07 | 1.12 |
| Exp. (d) | |Tan (ωW)/Tan (ωT)| | 9.32 | 7.69 | 10.72 |
| Exp. (e) | F1/FW | 5.97 | 6.24 | 6.41 |
| Exp. (f) | |LT/FT| | 1.27 | 1.40 | 1.16 |
| Exp. (g) | F1/FT | 0.70 | 0.92 | 0.64 |
| Exp. (h) | |β3T/β3W| | 2.38 | 2.41 | 2.32 |
| Exp. (i) | FM/FT | 0.34 | 0.38 | 0.52 |

<4. Application>

Configuration of Imaging Apparatus

Figure 13:
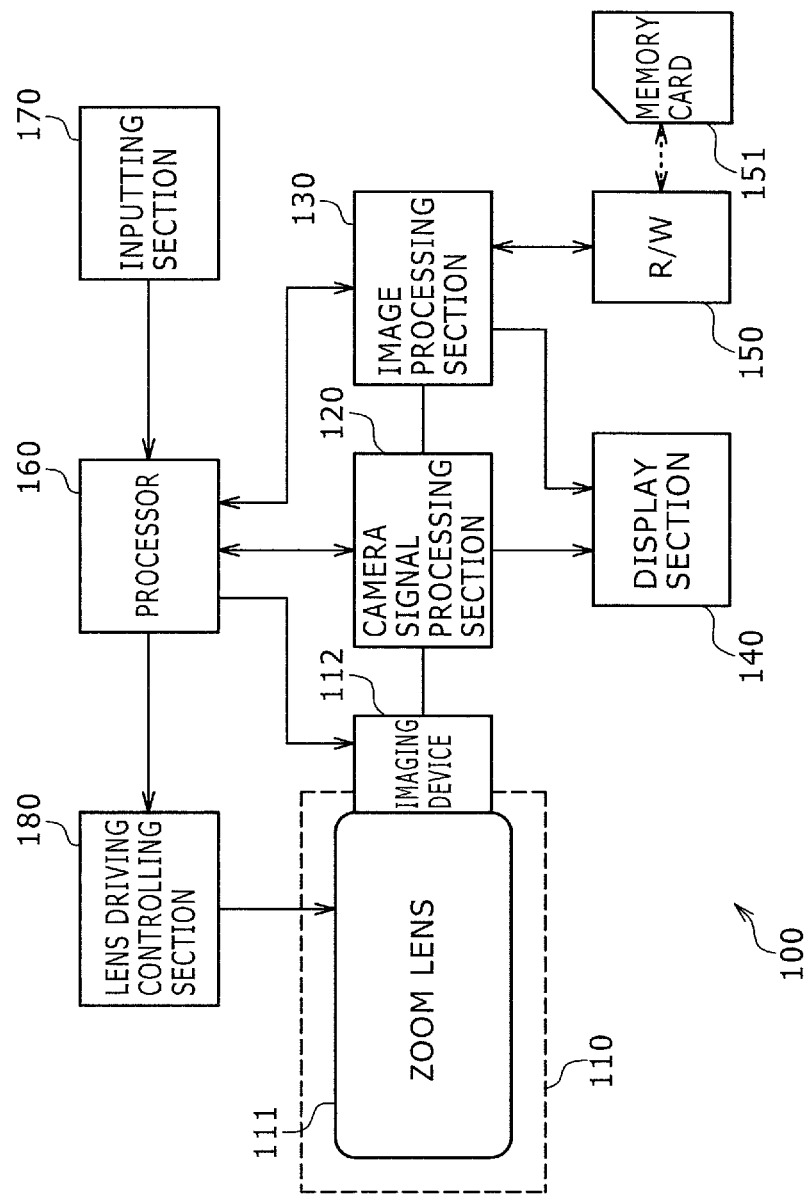
FIG. 13 is a block diagram showing an imaging apparatus to which any of the zoom lens of FIGS. 1A to 1C, 5A to 5C or 9A to 9C is applied.

FIG. 13 shows an example wherein the zoom lens according to any one of the first to third embodiments is applied to an imaging apparatus 100. Referring to FIG. 13, the imaging apparatus 100 includes a camera block 110, a camera signal processing section 120, an image processing section 130, a display section 140, a reader/writer (R/W) 150, a processor 160, an inputting section 170, and a lens driving controlling section 180.

The camera block 110 takes charge of an imaging function and is configured from an optical system including the zoom lens 111 according to the present disclosure, an imaging device 112 and so forth. The imaging device 112 is implemented, for example, by a CCD (Charge Coupled Device) unit or a CMOS (Complementary Metal Oxide Semiconductor) unit.

The camera signal processing section 120 carries out signal processing such as analog-digital conversion of a picked up image signal. Particularly, the camera signal processing section 120 carries out various signal processings such as conversion into a digital signal, noise removal, picture quality correction, conversion into a luminance signal and color difference signals and so forth for an output signal from the imaging device 112.

The image processing section 130 carries out recording and reproduction processes of an image signal. Particularly, the image processing section 130 carries out compression coding and decompression decoding processes of an image signal based on a predetermined image data format, a conversion process of data specifications such as a resolution and other necessary processes.

The display section 140 displays a picked up image and so forth. The display section 140 has a function of displaying various kinds of data of an operation state for the inputting section 170 by a user or picked up images. The display section 140 is implemented, for example, by an LCD (Liquid Crystal Display) unit.

The reader/writer 150 carries out writing and reading out of an image signal into and from a memory card 151. Particularly, the reader/writer 150 carries out writing of image data coded by the image processing section 130 into the memory card 151 or reading out of image data recorded in the memory card 151. It is to be noted that the memory card 151 is a semiconductor memory which is removably loaded into a slot connected to the reader/writer 150.

The processor 160 controls the entire imaging apparatus. The processor 160 functions as a controlling processing section which controls the circuit blocks provided in the imaging apparatus 100 and controls the circuit blocks based on an instruction input signal from the inputting section 170 and so forth.

The inputting section 170 is an interface configured from various switches and so forth which are operated by the user. Particularly, the inputting section 170 is configured from a shutter release button for triggering a shutter movement, a selection switch for selecting an operation mode and so forth. The lens driving controlling section 180 outputs an instruction input signal corresponding to an operation by the user to the processor 160.

The lens driving controlling section 180 controls driving of the lenses disposed in the camera block 110. The lens driving controlling section 180 particularly controls a motor for driving the lenses of the zoom lens 111 and so forth based on a control signal from the processor 160.

In the imaging apparatus 100, when it is in a standby state for imaging, an image signal obtained by the camera block 110 is outputted to the display section 140 through the camera signal processing section 120 so that it is displayed as a camera-through image under the control of the processor 160. Further, if an instruction input signal for zooming is inputted from the inputting section 170, then the processor 160 outputs a control signal to the lens driving controlling section 180 so that a predetermined lens or lenses of the zoom lens 111 are moved under the control of the lens driving controlling section 180.

If the shutter release button not shown of the camera block 110 is depressed in response to the instruction input signal from the inputting section 170, then an obtained image signal is outputted from the camera signal processing section 120 to the image processing section 130. Then, the image signal is subjected to a compression coding process so that it is converted into digital data of a predetermined data format. The data after the conversion is outputted to the reader/writer 150 and written into the memory card 151.

It is to be noted that focusing is carried out for example, when the shutter release button of the inputting section 170 is half-depressed or is fully depressed for recording or imaging. At this time, the focusing is carried out by the lens driving controlling section 180 moving a predetermined lens or lenses of the zoom lens 111 based on the control signal from the processor 160.

When image data recorded in the memory card 151 is to be reproduced, predetermined image data is read out from the memory card 151 by the reader/writer 150 in response to an operation for the inputting section 170. Then, a decompression decoding process is carried out by the image processing section 130, and a reproduction image signal is outputted to the display section 140 so that a reproduction image is displayed.

It is to be noted that, while the embodiment described above is directed to an example wherein the imaging apparatus is applied to a digital still camera, the application range of the imaging apparatus is not limited to the digital still camera. In particular, the imaging apparatus can be applied widely as a camera section or the like of a digital inputting and outputting devices such as a portable telephone set or a PDA (Personal Digital Assistant) in which a digital video camera or a digital still camera is incorporated and like apparatus.

In this manner, according to the embodiments of the present technology, since the zoom lens has a lens configuration of the lens groups described hereinabove, while the zoom lens can carry out zooming to six times or more, a spherical aberration, a field curvature and a distortional aberration in each zoom region can be corrected appropriately. Further, the overall optical length and the front lens diameter can be reduced. Also miniaturization of the zoom lens in a collapsed state can be implemented.

It is to be noted that the embodiments described hereinabove indicate examples for embodying the present technology, and matters in the embodiments and features described in the claims have a corresponding relationship to each other. Similarly, the features in the claims and matters in the embodiments of the present technology which have like names have a corresponding relationship to each other. However, the present technology is not limited to the embodiments but can be carried out by applying various alterations or modifications to the embodiments without departing from the subject matter of the present technology.

It is to be noted that the present technology can be configured also in the following manner.

(1) A zoom lens, including:

a first lens group having a positive refracting power;

a second lens group having a negative refracting power;

a third lens group having a positive refracting power; and a fourth lens group having a positive refracting power, the first, second, third and fourth lens groups being disposed in order from an object side, the lens groups moving upon zooming from a wide angle end to a telephoto end of the zoom lens such that the distance between the first lens group and the second lens group increases while the distance between the second lens group and the third lens group decreases, the first lens group being configured from a negative lens having a meniscus shape and a positive lens having a convex face on the opposite sides thereof, the negative lens and the positive lens being disposed in order from the object side, the second lens group being configured from a negative lens, another negative lens having a concave face on the opposite sides thereof, and a positive lens, the negative lenses and the positive lens being disposed in order from the object side, the third lens group being configured from a positive lens, a negative lens and another positive lens disposed in order from the object side, the fourth lens group being configured from a positive lens.

(2) The zoom lens according to (1), wherein the zoom lens satisfies the following conditional expression (a):

$$0.95 < |F2/FW| < 1.25 \tag{a}$$

where F2 is the focal length of the second lens group, and FW the focal length of the zoom lens at the wide angle end.

(3) The zoom lens according to (1) or (2), wherein the zoom lens satisfies the following conditional expression (b):

$$0.75 < |\beta 3W| < 1.0 \tag{b}$$

where $\beta 3W$ is the lateral magnification of the third lens group at the wide angle end.

(4) The zoom lens according to any one of (1) to (3), wherein the zoom lens satisfies the following conditional expression (c):

$$0.9 < L2/IM < 1.3 \tag{c}$$

where L2 is the distance from the vertex of the object side face of the negative lens on the object side to the vertex of the image side face of the positive lens in the second lens group, and IM is a maximum image height within a recording range on the image plane.

(5) The zoom lens according to any one of (1) to (4), wherein the zoom lens satisfies the following conditional expression (d):

$$6.0 < |\mathrm{Tan}(\omega W)/\mathrm{Tan}(\omega T)| < 16.0 \tag{d}$$

where $\omega W$ is the half angle of view of the zoom lens at the wide angle end, and $\omega T$ is the half angle of view of the zoom lens at the telephoto end.

(6) The zoom lens according to any one of (1) to (5), wherein the zoom lens satisfies the following conditional expression (e):

$$5.0 < F1/FW < 7.5 \tag{e}$$

where F1 is the focal length of the first lens group, and FW the focal length of the zoom lens at the wide angle end.

(7) The zoom lens according to any one of (1) to (6), wherein the zoom lens satisfies the following conditional expression (f):

$$1.0 < |LT/FT| < 1.5 \tag{f}$$

where LT is the overall optical length at the telephoto end of the zoom lens, and FT the focal length of the zoom lens at the telephoto end.

(8) The zoom lens according to any one of (1) to (7), wherein the zoom lens satisfies the following conditional expression (g):

$$0.5 < F1/FT < 1.2 \tag{g}$$

where F1 is the focal length of the first lens group, and FT the focal length of the zoom lens at the telephoto end.

(9) The zoom lens according to any one of (1) to (8), wherein the zoom lens satisfies the following conditional expression (h):

$$2.1 < |\beta 3T/\beta 3W| < 2.6 \tag{h}$$

where β3T is the lateral magnification of the third lens group at the telephoto end, and β3W is the lateral magnification of the third lens group at the wide angle end.

(10) The zoom lens according to any one of (1) to (9), wherein the negative lens and the positive lens of the first lens group are joined together to form a cemented lens, and the second negative lens and the third positive lens from the object side in the second lens group are not joined together.

(11) The zoom lens according to any one of (1) to (10), wherein the image side face of the positive lens of the first lens group and the object side face and the image side face of the negative lens positioned on the most object side in the second lens group have an aspheric face shape.

(12) The zoom lens according to any one of (1) to (11), further including an aperture stop provided between the second lens group and the third lens group and movable, upon zooming, integrally with the third lens group such that an F value is defined at each zoom position.

(13) The zoom lens according to any one of (1) to (12), wherein the positive lens on the object side and the negative lens of the third lens group are formed as a cemented lens wherein the lenses are joined together.

(14) The zoom lens according to any one of (1) to (13), wherein, upon focusing on an object, only the fourth lens group moves, and the zoom lens satisfies the following conditional expression (i):

$$0.2 < FM/FT < 0.8 \quad (i)$$

where FM is the focal length of the fourth lens group at the zoom position at which the positive lens of the fourth lens group is positioned nearest to the image side upon focusing on an infinitely remotely positioned object, and FT the focal length of the zoom lens at the telephoto end.

(15) The zoom lens according to any one of (1) to (14), further including a lens which has substantially no lens power.

(16) An imaging apparatus, including:

a zoom lens including a first lens group having a positive refracting power, a second lens group having a negative refracting power, a third lens group having a positive refracting power, and a fourth lens group having a positive refracting power, the first, second, third and fourth lens groups being disposed in order from the object side, the lens groups moving upon zooming from a wide angle end to a telephoto end of the zoom lens such that the distance between the first lens group and the second lens group increases while the distance between the second lens group and the third lens group decreases; and an imaging device configured to convert an optical image formed by the zoom lens into an electric signal, the first lens group being configured from a negative meniscus lens and a positive lens having a convex face on the opposite sides thereof, the negative lens and the positive lens being disposed in order from the object side, the second lens group being configured from a negative lens, another negative lens having a concave face on the opposite sides thereof, and a positive lens, the negative lenses and the positive lens being disposed in order from the object side, the third lens group being configured from a positive lens, a negative lens and another positive lens disposed in order from the object side, the fourth lens group being configured from a positive lens.

The present disclosure contains subject matter related to that disclosed in Japanese Priority Patent Application JP 2011-272948 filed in the Japan Patent Office on Dec. 14, 2011, the entire content of which is hereby incorporated by reference.

What is claimed is:

1. A zoom lens, comprising:
a first lens group having a positive refracting power;
a second lens group having a negative refracting power;
a third lens group having a positive refracting power; and
a fourth lens group having a positive refracting power,
the first, second, third and fourth lens groups being disposed in order from an object side,
the lens groups moving upon zooming from a wide angle end to a telephoto end of the zoom lens such that the distance between the first lens group and the second lens group increases while the distance between the second lens group and the third lens group decreases,
the first lens group comprising a negative lens having a meniscus shape and a positive lens having a convex face on the opposite sides thereof, the negative lens and the positive lens being disposed in order from the object side,
the second lens group comprising a negative lens, another negative lens having a concave face on the opposite sides thereof, and a positive lens, the negative lenses and the positive lens being disposed in order from the object side,
the third lens group comprising a positive lens, a negative lens and another positive lens disposed in order from the object side,
the fourth lens group comprising from a positive lens,
wherein the zoom lens satisfies the following conditional expression (a):

$$0.95 < |F2/FW| < 1.25 \quad (a)$$

where F2 is the focal length of the second lens group, and FW is the focal length of the zoom lens at the wide angle end.

2. The zoom lens according to claim 1, wherein the zoom lens satisfies the following conditional expression (a'):

$$1.00 < |F2/FW| < 1.20 \quad (a')$$

where F2 is the focal length of the second lens group, and FW is the focal length of the zoom lens at the wide angle end.

3. The zoom lens according to claim 1, wherein the zoom lens satisfies the following conditional expression (b):

$$0.75 < |\beta 3W| < 1.0 \quad (b)$$

where β3W is the lateral magnification of the third lens group at the wide angle end.

4. The zoom lens according to claim 1, wherein the zoom lens satisfies the following conditional expression (c):

$$0.9 < L2/IM < 1.3 \quad (c)$$

where L2 is the distance from the vertex of the object side face of the negative lens on the object side to the vertex of the image side face of the positive lens in the second lens group, and IM is a maximum image height within a recording range on the image plane.

5. The zoom lens according to claim 1, wherein the zoom lens satisfies the following conditional expression (d):

$$6.0 < |\mathrm{Tan}(\omega W)/\mathrm{Tan}(\omega T)| < 16.0 \quad (d)$$

where ωW is the half angle of view of the zoom lens at the wide angle end, and ωT is the half angle of view of the zoom lens at the telephoto end.

6. The zoom lens according to claim 1, wherein the zoom lens satisfies the following conditional expression (e):

$$5.0 < F1/FW < 7.5 \quad (e)$$

where F1 is the focal length of the first lens group, and FW is the focal length of the zoom lens at the wide angle end.

7. The zoom lens according to claim 1, wherein the zoom lens satisfies the following conditional expression (f):

$$1.0 < |LT/FT| < 1.5 \qquad (f)$$

where LT is the overall optical length at the telephoto end of the zoom lens, and FT is the focal length of the zoom lens at the telephoto end.

8. The zoom lens according to claim 1, wherein the zoom lens satisfies the following conditional expression (g):

$$0.5 < F1/FT < 1.2 \qquad (g)$$

where F1 is the focal length of the first lens group, and FT is the focal length of the zoom lens at the telephoto end.

9. The zoom lens according to claim 1, wherein the zoom lens satisfies the following conditional expression (h):

$$2.1 < |\beta 3T/\beta 3W| < 2.6 \qquad (h)$$

where $\beta 3T$ is the lateral magnification of the third lens group at the telephoto end, and $\beta 3W$ is the lateral magnification of the third lens group at the wide angle end.

10. The zoom lens according to claim 1, wherein
the negative lens and the positive lens of the first lens group are joined together to form a cemented lens, and
the second negative lens and the third positive lens from the object side in the second lens group are not joined together.

11. The zoom lens according to claim 1, wherein the image side face of the positive lens of the first lens group and the object side face and the image side face of the negative lens positioned on the most object side in the second lens group have an aspheric face shape.

12. The zoom lens according to claim 1, further comprising
an aperture stop provided between the second lens group and the third lens group and movable, upon zooming, integrally with the third lens group such that an F value is defined at each zoom position.

13. The zoom lens according to claim 1, wherein the positive lens on the object side and the negative lens of the third lens group are formed as a cemented lens wherein the lenses are joined together.

14. The zoom lens according to claim 1, wherein, upon focusing on an object, only the fourth lens group moves, and the zoom lens satisfies the following conditional expression (i):

$$0.2 < FM/FT < 0.8 \qquad (i)$$

where FM is the focal length of the fourth lens group at the zoom position at which the positive lens of the fourth lens group is positioned nearest to the image side upon focusing on an infinitely remotely positioned object, and FT is the focal length of the zoom lens at the telephoto end.

15. An imaging apparatus, comprising:
a zoom lens including a first lens group having a positive refracting power, a second lens group having a negative refracting power, a third lens group having a positive refracting power, and a fourth lens group having a positive refracting power, the first, second, third and fourth lens groups being disposed in order from the object side, the lens groups moving upon zooming from a wide angle end to a telephoto end of the zoom lens such that the distance between the first lens group and the second lens group increases while the distance between the second lens group and the third lens group decreases; and
an imaging device configured to convert an optical image formed by the zoom lens into an electric signal,
the first lens group comprising a negative meniscus lens and a positive lens having a convex face on the opposite sides thereof, the negative lens and the positive lens being disposed in order from the object side,
the second lens group comprising a negative lens, another negative lens having a concave face on the opposite sides thereof, and a positive lens, the negative lenses and the positive lens being disposed in order from the object side,
the third lens group comprising a positive lens, a negative lens and another positive lens disposed in order from the object side,
the fourth lens group comprising a positive lens,
wherein the zoom lens satisfies the following conditional expression (a):

$$0.95 < |F2/FW| < 1.25 \qquad (a)$$

where F2 is the focal length of the second lens group, and FW is the focal length of the zoom lens at the wide angle end.

16. The imaging apparatus according to claim 15, wherein
the negative lens and the positive lens of the first lens group are joined together to form a cemented lens, and
the second negative lens and the third positive lens from the object side in the second lens group are not joined together.

17. The imaging apparatus according to claim 15, wherein the image side face of the positive lens of the first lens group and the object side face and the image side face of the negative lens positioned on the most object side in the second lens group have an aspheric face shape.

18. The imaging apparatus according to claim 15, further comprising
an aperture stop provided between the second lens group and the third lens group and movable, upon zooming, integrally with the third lens group such that an F value is defined at each zoom position.

19. The imaging apparatus according to claim 15, wherein the positive lens on the object side and the negative lens of the third lens group are formed as a cemented lens wherein the lenses are joined together.

* * * * *